US010169073B2

(12) United States Patent
Drysdale et al.

(10) Patent No.: US 10,169,073 B2
(45) Date of Patent: Jan. 1, 2019

(54) HARDWARE ACCELERATORS AND METHODS FOR STATEFUL COMPRESSION AND DECOMPRESSION OPERATIONS

(71) Applicant: Intel Corporation, Santa Clara, CA (US)

(72) Inventors: Tracy G. Drysdale, Paradise Valley, AZ (US); James D. Guilford, Northborough, MA (US); Vinodh Gopal, Westborough, MA (US); Gilbert M. Wolrich, Framingham, MA (US); James T. Kukunas, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 14/975,847

(22) Filed: Dec. 20, 2015

(65) Prior Publication Data
US 2017/0177404 A1 Jun. 22, 2017

(51) Int. Cl.
G06F 9/46 (2006.01)
G06F 9/50 (2006.01)

(52) U.S. Cl.
CPC .......... G06F 9/466 (2013.01); G06F 9/5061 (2013.01)

(58) Field of Classification Search
CPC .................. G06F 9/466; G06F 9/5061
See application file for complete search history.

(56) References Cited

U.S. PATENT DOCUMENTS 5,606,665 A 2/1997 Yang et al.
6,490,669 B1 * 12/2002 Yabe ................... G11C 7/1006
710/20
9,304,920 B2 4/2016 Munoz
(Continued)

FOREIGN PATENT DOCUMENTS

WO 2012009150 1/2012

OTHER PUBLICATIONS

International Search Report and Written Opinion for Application No. PCT/US2016/063208, dated Mar. 6, 2017, 10 pages.
(Continued)

Primary Examiner — Camquy Truong
(74) Attorney, Agent, or Firm — Nicholson De Vos Webster & Elliott LLP

(57) ABSTRACT

Methods and apparatuses relating to stateful compression and decompression operations are described. In one embodiment, hardware processor includes a core to execute a thread and offload at least one of a compression and decompression thread, and a hardware compression and decompression accelerator to execute the at least one of the compression and decompression thread to consume input and generate output data, wherein the hardware compression and decompression accelerator is coupled to a plurality of input buffers to store the input data, a plurality of output buffers to store the output data, an input buffer descriptor array with an entry for each respective input buffer, an input buffer response descriptor array with a corresponding response entry for each respective input buffer, an output buffer descriptor array with an (Continued)

entry for each respective output buffer, and an output buffer response descriptor array with a corresponding response entry for each respective output buffer.

24 Claims, 18 Drawing Sheets

(56) References Cited

U.S. PATENT DOCUMENTS

| | | |
|---|---|---|
| 2004/0139284 A1 | 7/2004 | Clayton et al. |
| 2007/0157211 A1 | 7/2007 | Wang et al. |
| 2008/0244118 A1 | 10/2008 | Accapadi et al. |
| 2008/0244126 A1 | 10/2008 | Hundley |
| 2009/0234989 A1 | 9/2009 | Fischer |
| 2011/0145514 A1 | 6/2011 | Lee et al. |
| 2011/0283061 A1* | 11/2011 | Reddy .................... G11C 15/00 711/108 |
| 2011/0320777 A1 | 12/2011 | Nemiroff et al. |
| 2013/0138918 A1* | 5/2013 | Muff .................... G06F 15/7825 712/24 |
| 2014/0244944 A1 | 8/2014 | Mortier |
| 2015/0046678 A1 | 2/2015 | Moloney et al. |
| 2015/0058495 A1 | 2/2015 | Droege et al. |
| 2015/0186268 A1 | 7/2015 | Asaad et al. |
| 2015/0301975 A1 | 10/2015 | Garg et al. |
| 2016/0132329 A1 | 5/2016 | Deepak et al. |
| 2018/0095750 A1 | 4/2018 | Drysdale et al. |

OTHER PUBLICATIONS

International Search Report and Written Opinion for Application No. PCT/US2017/049407, dated Dec. 11, 2017, 11 pages.

Non-Final Office Action from U.S. Appl. No. 15/282,372, dated Jun. 19, 2018, 12 pages.

PCT/US2017/049407 Notification of Transmittal of the International Search Report and the Written Opinion of the International Searching Authority, dated Dec. 11, 2017, 11 pages.

* cited by examiner

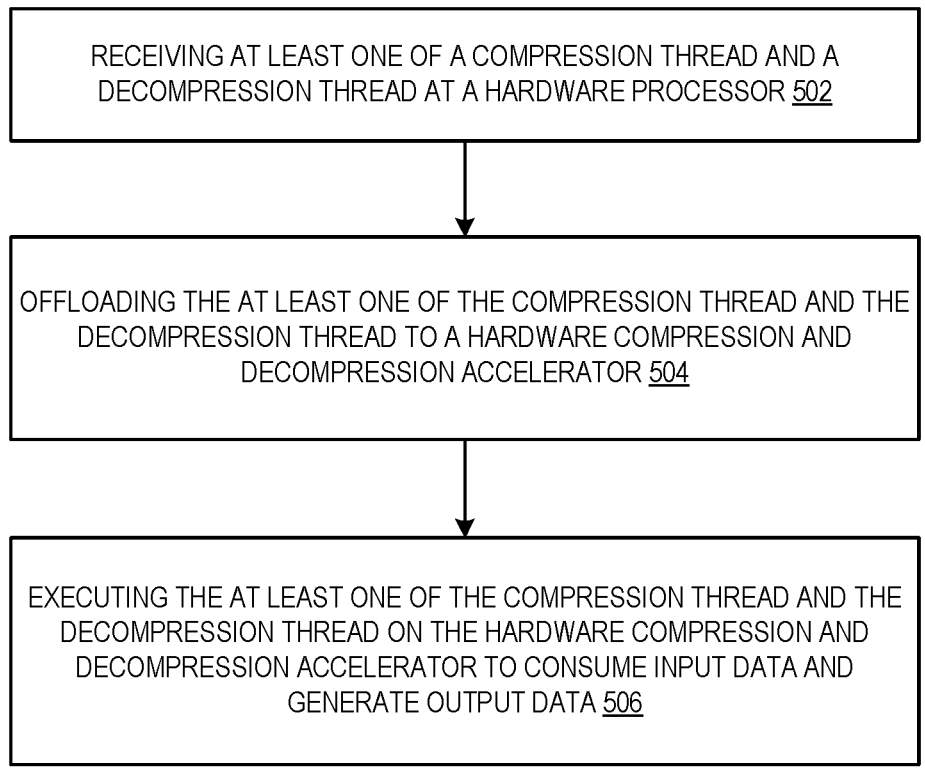

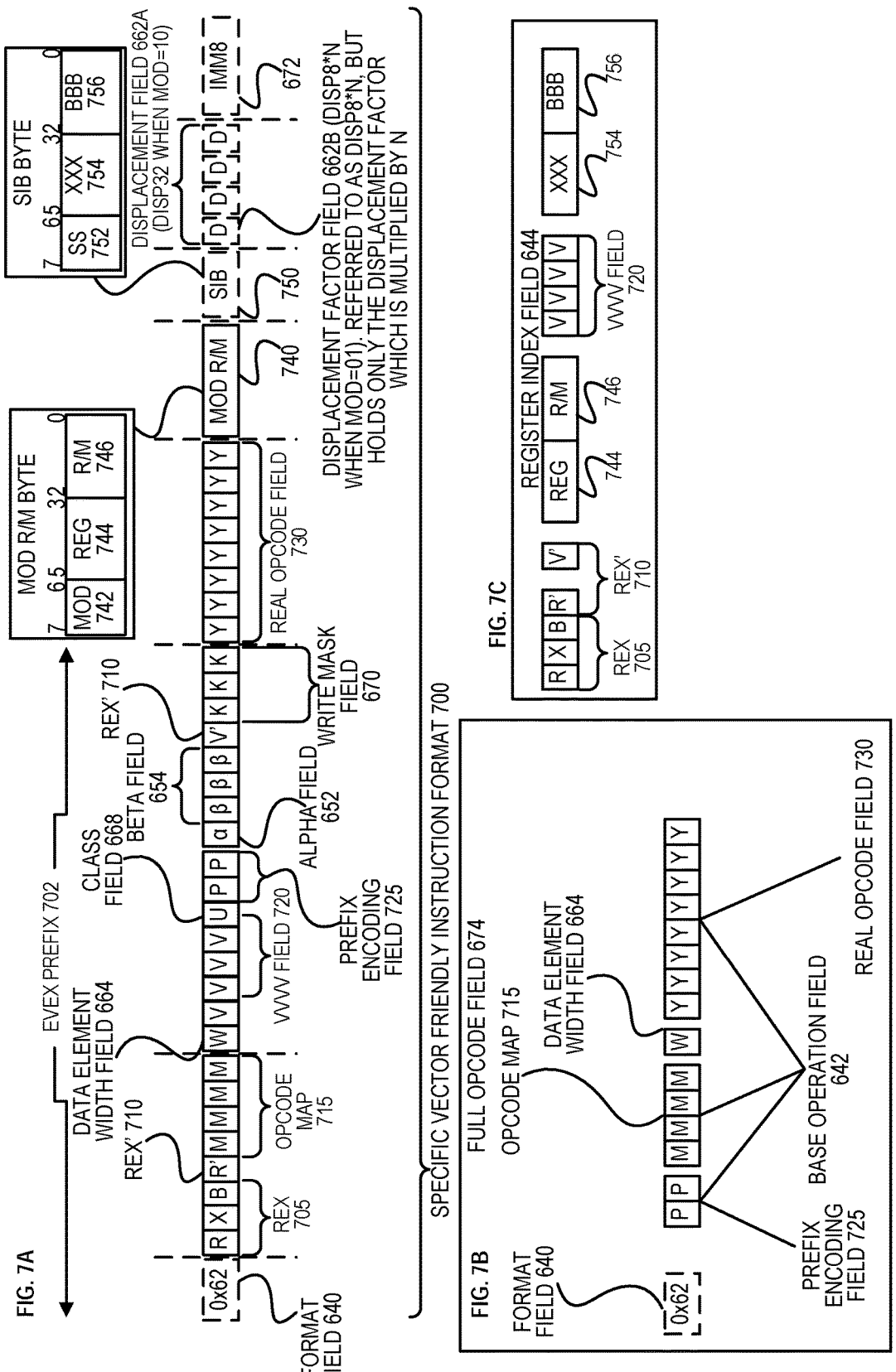

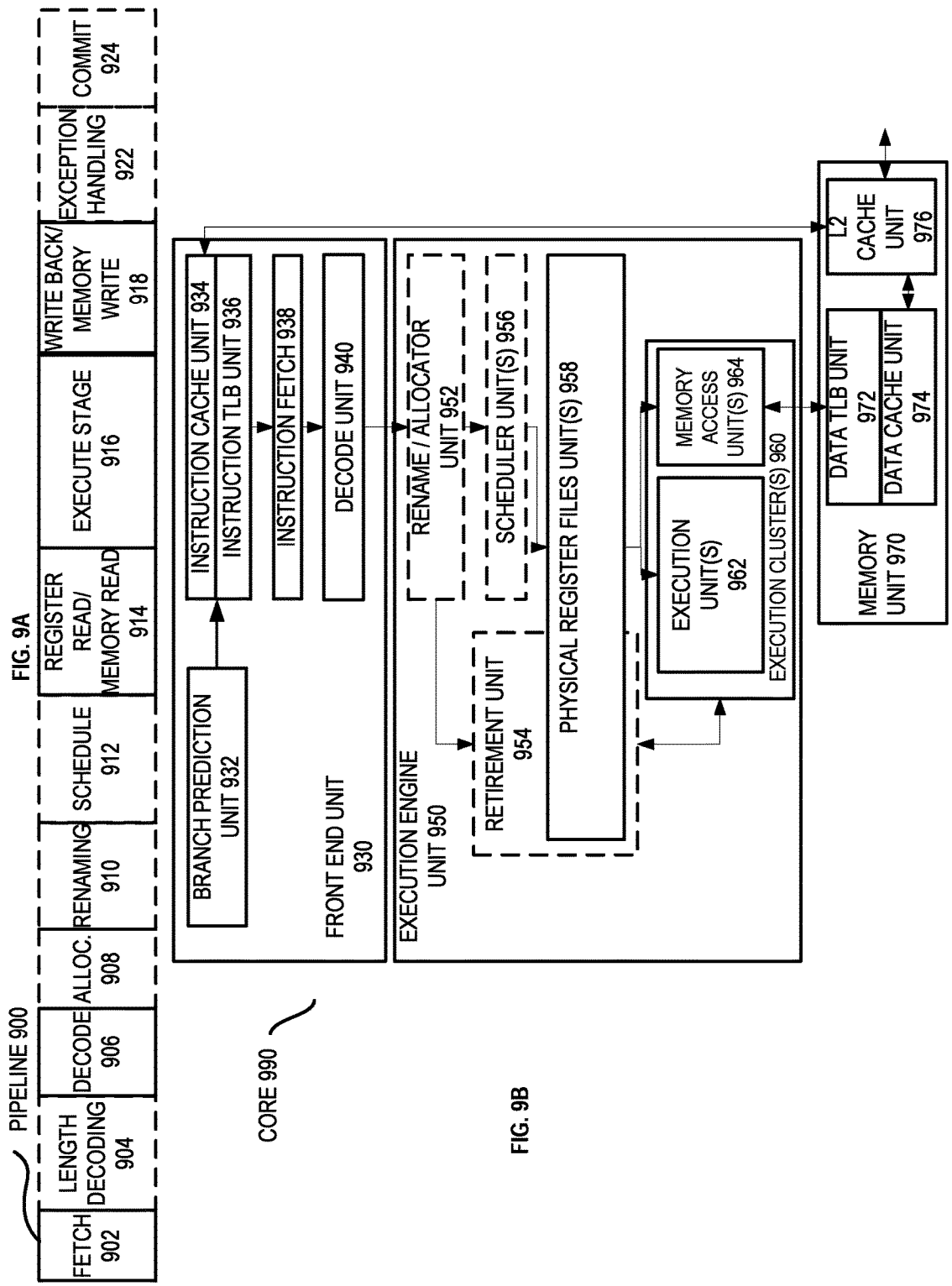

US 10,169,073 B2

HARDWARE ACCELERATORS AND METHODS FOR STATEFUL COMPRESSION AND DECOMPRESSION OPERATIONS

TECHNICAL FIELD

The disclosure relates generally to electronics, and, more specifically, an embodiment of the disclosure relates to a hardware compression and decompression accelerator to perform a compression operation and/or decompression operation.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 5 illustrates a flow diagram of an acceleration operation according to embodiments of the disclosure.

FIG. 7A is a block diagram illustrating fields for the generic vector friendly instruction formats in FIGS. 6A and 6B according to embodiments of the disclosure.

FIG. 7B is a block diagram illustrating the fields of the specific vector friendly instruction format in FIG. 7A that make up a full opcode field according to one embodiment of the disclosure.

FIG. 7C is a block diagram illustrating the fields of the specific vector friendly instruction format in FIG. 7A that make up a register index field according to one embodiment of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
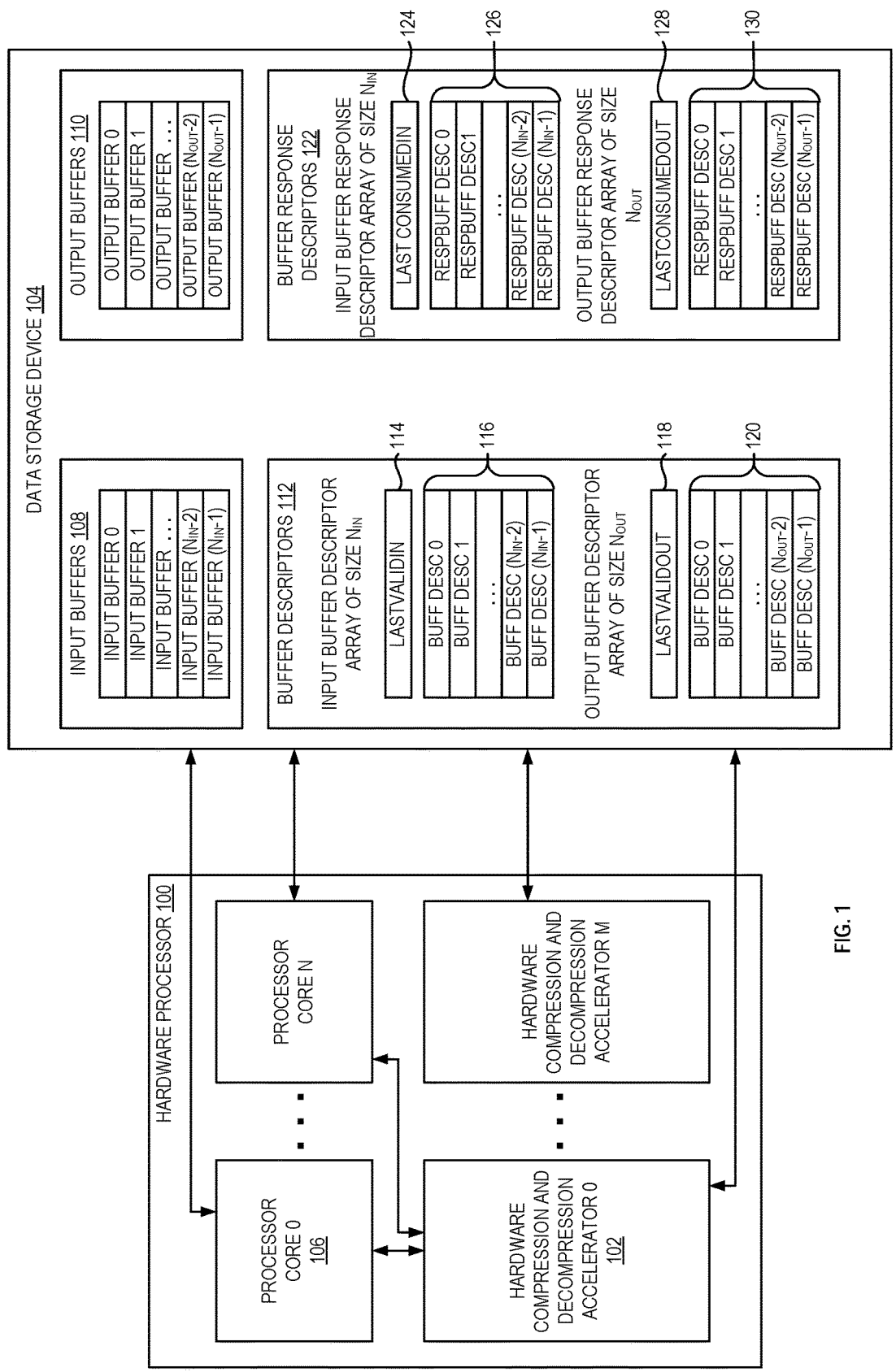
FIG. 1 illustrates a hardware processor including a plurality of cores and hardware compression and decompression accelerators according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In one embodiment, a processor is coupled to an (e.g., on die) accelerator (e.g., an offload engine) to perform one or more (e.g., offloaded) operations, for example, instead of those operations being performed only on the processor. In one embodiment, a processor includes an (e.g., on die) accelerator (e.g., an offload engine) to perform one or more operations, for example, instead of those operations being performed only on the processor.

Two non-limiting examples of operations are a compression operation and a decompression operation. A compression operation may refer to encoding information using fewer bits than the original representation. A decompression operation may refer to decoding the compressed information back into the original representation. A compression operation may compress data from a first format to a compressed, second format. A decompression operation may decompress data from a compressed, first format to an uncompressed, second format. A compression operation may be performed according to an (e.g., compression) algorithm. A decompression operation may be performed according to an (e.g., decompression) algorithm.

In one embodiment, an accelerator may perform a compression operation (e.g., thread) and/or decompression operation (e.g., thread), for example, in response to a request to and/or for a processor (e.g., a central processing unit (CPU)) to perform that operation. An accelerator may couple to (e.g., on die with an accelerator or off die) one or more buffers to store data, e.g., the input data and/or the output data. In one embodiment, an accelerator couples to an input buffer to load input therefrom and an output buffer to store output thereon. A processor may execute an instruction to offload an operation or operations (e.g., an instruction, a thread of instructions, or other work) to an accelerator.

An operation may be performed on a stream of input data. A stream of data may be provided in blocks of smaller (e.g., different) sizes than the entire block, e.g., with the smaller blocks provided until the operation is performed on the entire block. A stateful stream of data may have each subset of data (e.g., in its respective buffer) thereof being submitted (e.g., operated on) in its original order (e.g., to an accelerator), for example, to be compressed or decompressed in a stateful manner. For example, all the utilized buffers may cumulatively store one entire block (e.g., file) of (e.g., continuous) data, for example, to be compressed or decompressed. A stateless stream of data may have each subset of data (e.g., in its respective buffer) thereof being submitted (e.g., operated on) in any (e.g., non-original) order (e.g., to an accelerator), for example, with each subset of data being independent from the other subsets of data (e.g., blocks). In one embodiment, each subset (e.g., block) of a stateless stream of data is compressed independently of any other subset (e.g., block) of the data, for example, such that no state is maintained between the subsets (e.g., blocks) and the data stream may therefore be referred to as stateless. For example, a data stream may be stateless when each subset of data (e.g., a sliding (e.g., 32 kilobyte (KB)) window) may be completely maintained within the subset (e.g., block) currently being operated on (e.g., compressed) and may not reference any other subsets (e.g., blocks). For example, each subset of data (e.g., block) of a stateless stream of data may be compressed or decompressed as its own independent job.

Stateful compression and stateful decompression may be referred to as stateful because of a sliding window of (e.g., backward) references (e.g., string references), for example, in the original order of the data. In one stateful operation, a sliding window may reference data in any previous data within a certain range (e.g., 32 KB or 64 KB) of the current data being compressed or decompressed. For example, in the DEFLATE algorithm, the window size may be 32 KB. The window size may be selected as desired, e.g., it may vary for other algorithms. In one embodiment, a stateful operation submitted to an accelerator (e.g., offload device) is executed in order and has access to a previous window (e.g., 32 KB) of data (e.g., to compress or decompress) at a given point, for example, even if that (e.g., 32 KB) window is in a previously submitted (e.g., separate) buffer. In one embodiment, when an accelerator is to stop (e.g., before completion) processing on a data set (e.g., a context), it may save the (e.g., 32 KB) window, for example, so the previous window's data may be reloaded into the accelerator when it starts processing that data set (e.g., context) again.

In one embodiment, a (e.g., compression) algorithm is to work on a (e.g., greater than 128 KB) data set that is to be broken into a plurality of smaller subsets of data (e.g., 32 KB or 64 KB (e.g., mallocs)). A processing device (e.g., a processor) may call a compression or decompression function multiple times, e.g., once for each subset of data. The processing device (e.g., software running thereon) may also allocate (e.g., provide) an input buffer and/or output buffer to hold the (e.g., source and/or output compressed or decompressed) data for each call. In certain embodiments, compression and/or decompression is data dependent, and thus the output size of the compressed or decompressed data is not known (e.g., a priori or during allocation of buffers). In one embodiment of compression, for any uncompressible content, the size of the output data may be larger than the input data. One solution may be to size the output buffer as a multiple of (e.g., two to 20 times) the size of the input buffer. However, this may be wasteful memory consumption in some embodiments, for example, where the compression operation compresses the size of the output data (e.g., file) to less than (e.g., 40% of) the size of the input data (e.g., file). Another solution may be to size a (e.g., input and/or output buffer) at about the expected size of the resultant of the (e.g., compression or decompression) operation, but then handle any situation where the data does not properly fit in an output buffer and/or all of the data is not consumed (e.g., operated on) from the input buffer.

In one embodiment, a processing device (e.g., the software running thereon) may call a compression and/or decompression function to operate with an input buffer and output buffer (e.g., and a pointer to a state region) and then check the result to see if the output was filled and/or the input was fully consumed. In one embodiment, based on this, a new input and/or output buffer may be allocated and a subsequent function call may be made, for example, with the updated state from the previous call. However, in certain embodiments, this method of blocking calls may be undesirable (e.g., lead to sub-optimal performance) when the compression and/or decompression is done via a hardware (e.g., compression and/or decompression) accelerator (e.g., acceleration engine).

In one embodiment, there may be a latency of submission of a request to an acceleration engine and the response back. For example, during this latency time, a (e.g., software) thread may be blocked and/or idle (for example, negatively affecting the power and/or processing resource utilization) due to the serialized nature of processing, and/or may have that thread's context swapped out (for example, adding overhead to move the (e.g., processing resource (e.g., CPU) context with each compress or decompress call)). Certain embodiments of a serial submission model may also be problematic on the accelerator, for example, when the compression (or decompression) algorithm includes state (for example, an amount greater than 100 KB, e.g., depending on the type of algorithm) to move in and/or out (e.g., of the accelerator) with each call (e.g., where the call provides 32 KB or 64 KB of new data). This may add a (e.g., undesirable) performance overhead and/or cause a critical bandwidth crunch at the accelerator attach-point (e.g., such that an accelerator may not implement stateful compression and/or decompression for an algorithm at a rate greater than 100 Gbits/second). Another alternative may be to keep the (e.g., hardware) accelerator locked and not move the state in or out, but this may lead to a less efficient (e.g., undesirable) utilization of the (e.g., hardware) accelerator, for example, due to the next call (which is to be made after the completion of the previous call) may include waking up the (e.g., software) thread, allocating a new input and/or output buffer, and sending in a new request which then may be idled while it moves up to the head of some queue to be serviced, e.g., during which time(s) the accelerator is idle.

In one embodiment, a serialized and blocking scheme may submit a call(s) (e.g., from software) to an accelerator to execute a compression thread and/or decompression thread (e.g., operation or function). An accelerator may operate on data until either an input buffer is emptied or an output buffer is filled (e.g., with the input and output data buffers returned for reuse (e.g., by a processor) when each request completes). However, in one embodiment, if an output buffer fills and input remains, left-over input is to be resubmitted for operation on, e.g., a back to back submission of new data may not be performed.

Certain embodiments herein provide for a novel techniques to improve the interaction between a processing device (e.g., software running thereon) and a hardware accelerator, for example, for improved performance. In one embodiment, a call for an operation (e.g., to perform compression and/or decompression) by an accelerator coupled to a processing device is not considered a mere request to the accelerator to perform the operation. Instead in this embodiment, an initial request may set up the context for the operation (e.g., the compression and/or decompression job). The input buffers may be submitted to a per-context queue of buffers. The output buffers may be submitted to a per-context queue of buffers. In one embodiment, there is no (e.g., strict) correlation between the input and output buffers. So for example, an accelerator may consume less than all (e.g., half) of the data in a first input buffer and find that a first output buffer is full of output data. The accelerator in this example may then start to use a second output buffer in the queue of buffers (for example, while signaling the (e.g., software) thread that an output buffer is now available) and may then finish consuming (e.g., processing) the data in the first input buffer. In one embodiment, the accelerator proceeds to (e.g., seamlessly) working on the input data from a second input buffer (for example, while signaling the (e.g., software) thread that another input buffer was consumed) which may generate (e.g., produce) data that is sent for storage in the second output buffer (e.g., and a third output buffer and so on if necessary). In certain embodiments herein, the responses back from the accelerator are thus not tied to the notion of a compression or decompression call, but rather to the operation(s) on any (e.g., input or output) buffer being done (e.g., the data in an input buffer being fully consumed or a new output buffer being available for use). Certain embodiments herein allow for the (e.g., software to) providing of a plurality (e.g., 2, 3, 4, 5, 6, 7, 8, 9, 10, etc.) of input and output buffers, and then waiting for the done responses to see if and/or how many more (e.g., input or output) buffers to provide. In one embodiment, this may happen independently and in parallel with the accelerator running. In one embodiment, as long as the system (e.g., software) may provide (e.g., an input or output) buffers at or about at the average consumption rate of (e.g., an input or output) buffers, there may be no (e.g., strict) serialization and/or latency between the system (e.g., software) and accelerator. This embodiment may lead to better latency and throughput, but also may avoid state save and/or restore on the accelerator.

In certain embodiments, a processing device (e.g., processor or core thereof) may offload a compression operation (e.g., thread) and/or a decompression operation (e.g., thread) to a hardware accelerator (e.g., an accelerator circuit). In one embodiment, a hardware accelerator is coupled to an input and output buffer, e.g., to receive a stateful stream of input data to operate on to produce output data. A hardware accelerator may be coupled to one or more of: a plurality of input storage (e.g., buffers) to store the input data, a plurality of output storage (e.g., buffers) to store the output data, an input buffer descriptor storage (e.g., array) with an entry for each respective input buffer, an input buffer response descriptor storage (e.g., array) with a corresponding response entry for each respective input buffer, an output buffer descriptor storage (e.g., array) with an entry for each respective output buffer, and an output buffer response descriptor storage (e.g., array) with a corresponding response entry for each respective output buffer. An input and/or output buffer descriptor entry may include a pointer to a buffer, a size of the data in the buffer, a buffer flag, or any combination thereof. An input and/or output return buffer descriptor entry may include a size of the data in the buffer (e.g., the size of the data remaining in an input buffer and/or the size of the unused portion of an output buffer), a buffer flag, or both (e.g., but without a pointer). The term size of the data may refer to the total size of the data, for example, not the size of each element of multiple elements of data.

Although this disclosure includes embodiments in the context of compression and compression algorithms, the disclosure may be extended to other domains. Certain embodiments herein may enable back-to-back calls to (e.g., execute a thread on) an accelerator for a stateful stream of data, for example, without allocating a worst-case size of data buffers for the input and/or output streams and/or with allowing the accelerator to be efficiently (e.g., highly) utilized.

Certain embodiments herein provide for input and output buffer submission and/or responses to be asynchronous. Certain embodiments herein may include one or more of the following: buffers are passed to an accelerator, an accelerator may have exclusive ownership of those buffers until explicitly returned, buffer return may not be tied to request completion (e.g., completion of a thread sent to the accelerator for execution), an accelerator may cease operation on a (e.g., current) context when out of either input or output buffer space (e.g., but does not cease operation on (e.g., return) buffers that have valid input remaining), allow continuing operation on a current context if new buffer(s) arrive in time, and decoupling input and output buffers from each other and from the request submission model. Certain embodiments herein may improve accelerator performance, reduce latency, and positively impact system performance. Certain embodiments herein may reduce save and/or restore bandwidth (e.g., and the associated performance overheads), for example, in the compression and/or decompression of a stateful stream of input data. Certain embodiments herein may include an accelerator to implement stateful compression and/or decompression for an algorithm at a rate greater than 100 Gbits/second (e.g., at a rate of about 200-400 Gbits/second).

FIG. 1 illustrates a hardware processor 100 including a plurality of cores (O to N, where N may be 1 or more) and hardware compression and decompression accelerators (O to M, where M may be 1 or more) according to embodiments of the disclosure. Hardware processor 100 (e.g., accelerator(s) and/or core(s) thereof) may be coupled to a data storage device 104 (e.g., memory). In one embodiment, memory may be dynamic random access memory (DRAM), private (e.g., private to an accelerator) random access memory (RAM), cache memory, or system memory. Although a plurality of hardware compression and decompression accelerators (O to M) are depicted, a single hardware compression and decompression accelerator may be utilized, e.g., accelerator 0 (102). Although a plurality of cores are depicted, a single core may be utilized, e.g., core 0 (106). A hardware compression and decompression accelerator may be a hardware compression and decompression circuit (e.g., logic).

A processor 100 (e.g., core 106) may receive a request (e.g., from software) to perform a compression and/or decompression operation and may offload (e.g., at least part of) the compression operation (e.g., thread) and/or a decompression operation (e.g., thread) to a hardware accelerator (e.g., accelerator 102). Cores, accelerators, and data storage device 104 may communicate (e.g., be coupled) with each other. Arrows indicate two way communication (e.g., to and from a component), but one way communication may be used. In one embodiment, a (e.g., each) core may communicate (e.g., be coupled) with the data storage device, for example, one or more of: input buffers 108, output buffers 110, buffer descriptors 112, and response descriptors 112. In one embodiment, a core may not write to the buffer response descriptors 122. In one embodiment, an (e.g., each) accelerator may communicate (e.g., be coupled) with the data storage device, for example, one or more of: input buffers 108, output buffers 110, buffer descriptors 112, and response descriptors 112. In one embodiment, an accelerator may not write to the buffer descriptors 112.

In one embodiment, a hardware compression and decompression accelerator may be in processor 100. Hardware accelerator (e.g., each hardware accelerator) may be coupled to (e.g., its own) input buffer and/or output buffer, e.g., to receive a stateful stream of input data to operate on to produce output data. Hardware accelerator (e.g., each hardware accelerator) may be coupled to one or more of: a plurality of input buffers 108 to store the input data, a plurality of output buffers 110 to store the output data, buffer descriptors 112 storage, and buffer response descriptors 122, for example, as discussed further below. Buffer descriptors 112 may include one or more of: an input buffer descriptor storage (e.g., array 116 with an entry for each respective input buffer) and/or pointer 114 to the last valid input buffer, and an output buffer descriptor storage (e.g., array 120 with an entry for each respective output buffer) and/or a pointer 118 to the last valid output buffer. Buffer response descriptors 122 may include one or more of: an input buffer response descriptor storage (e.g., array 126 with a corresponding response entry for each respective input buffer) and/or a pointer 124 to the last consumed input buffer, and an output buffer response descriptor storage (e.g., array 130 with a corresponding response entry for each respective output buffer) and/or a pointer 128 to the last consumed output buffer. An input and/or output buffer descriptor entry may include a pointer to an (e.g., input or output) buffer, a size of the data in that buffer, a buffer flag, or any combination thereof. An input and/or output return buffer descriptor entry may include a size of the data in the buffer (e.g., the size of the data remaining in an input buffer and/or the size of the unused portion of an output buffer), a buffer flag, or both (e.g., but without a pointer). The term size of the data may refer to the total size of the data, for example, not the size of each element of multiple elements of data. In one embodiment, the number of entries in the storage (e.g., array 116 and array 126) for the input buffer descriptors and input buffer response descriptors is the same as the number of input buffers used (e.g., for a context) for example, allocated, e.g., $N_{IN}$. Additional or alternatively, the number of entries in the storage (e.g., array 120 and array 130) for the output buffer descriptors and output buffer response descriptors is that same as the number of output buffers used (e.g., for a context), for example, allocated, e.g., $N_{OUT}$. In one embodiment, a buffer may be a circular buffer. Although the pointers are shown as adjacent to the arrays, other embodiments may store the pointers elsewhere, e.g., local to an accelerator.

Figure 2:
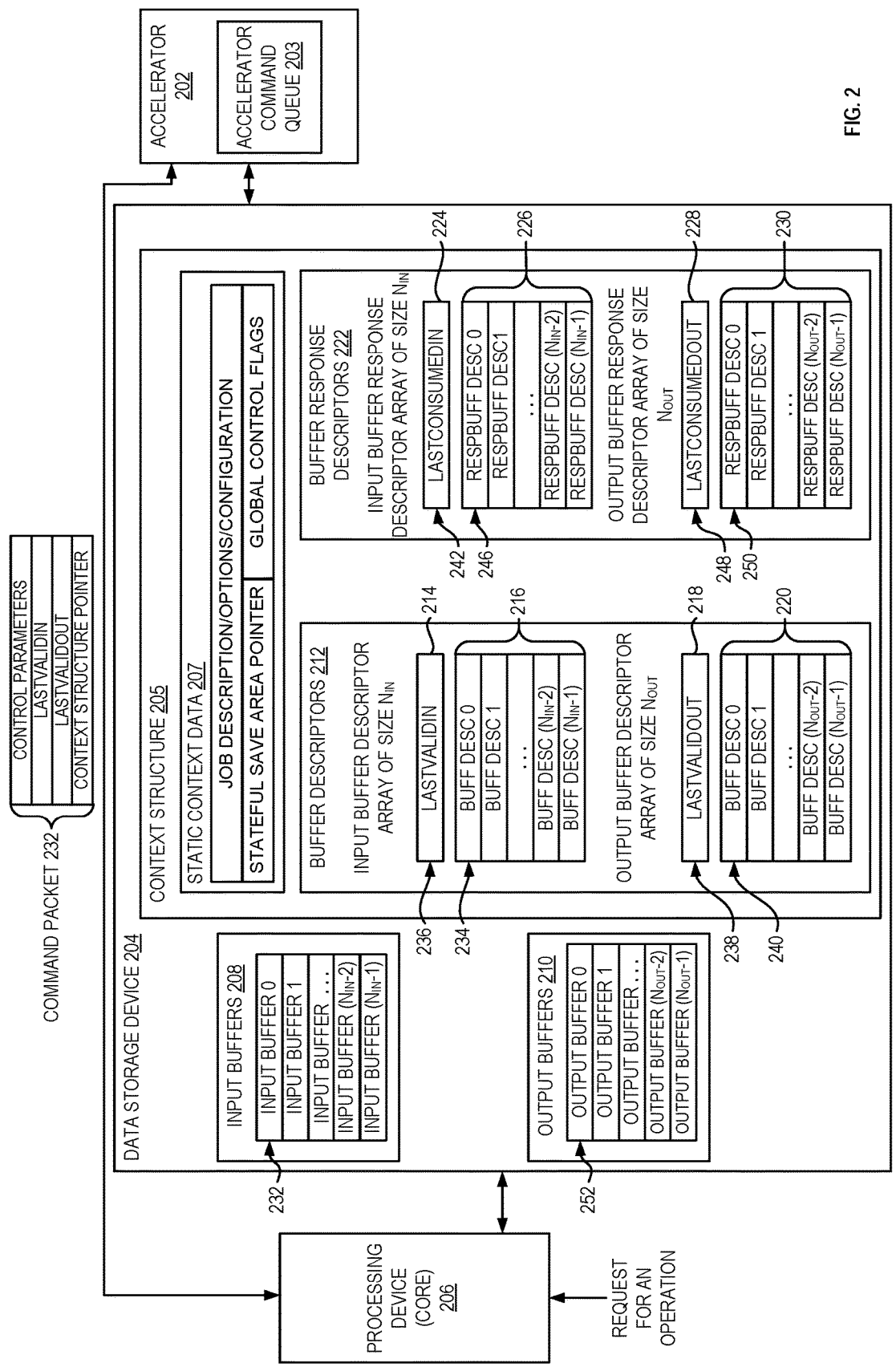
FIG. 2 illustrates a hardware processing device and a hardware compression and decompression accelerator according to embodiments of the disclosure.

An example operation will now be discussed in reference to FIG. 2. FIG. 2 illustrates a hardware processing device (e.g., core) 206 and a hardware compression and decompression accelerator 202. In another embodiment a plurality of hardware compression and decompression accelerators may be used. Depicted hardware processing device 206 and accelerator 202 may communicate (e.g., via a coupling or other connection) with data storage device 204 (e.g., memory).

A processing device (e.g., core) 206 may receive a request (e.g., from software) to perform a compression and/or decompression operation and may offload the compression operation (e.g., thread) and/or a decompression operation (e.g., thread) to hardware accelerator 202. Request(s) may be stored in optional accelerator command queue 203, which may be local to the accelerator 202 or separate therefrom. Hardware accelerator 202 may be coupled to one or more of: a plurality of input buffers 208 to store the input data, a plurality of output buffers 210 to store the output data (e.g., to receive a stateful stream of input data to operate on to produce output data.), buffer descriptors 212 storage, and buffer response descriptors 222 storage. Buffer descriptors 212 may include one or more of: an input buffer descriptor storage (e.g., array 216 with an entry for each respective input buffer) and/or pointer 214 to the last valid input buffer, and an output buffer descriptor storage (e.g., array 220 with an entry for each respective output buffer) and/or a pointer 218 to the last valid output buffer. Buffer response descriptors 222 may include one or more of: an input buffer response descriptor storage (e.g., array 226 with a corresponding response entry for each respective input buffer) and/or a pointer 224 to the last consumed (e.g., by the accelerator) input buffer, and an output buffer response descriptor storage (e.g., array 230 with a corresponding response entry for each respective output buffer) and/or a pointer 228 to the last consumed (e.g., by the accelerator) output buffer. An input and/or output buffer descriptor entry may include a pointer to an (e.g., input or output) buffer (e.g., buffers 0 to N−1), a size of the data in that buffer, a buffer flag, or any combination thereof. An input and/or output return buffer descriptor entry may include a size of the data in the buffer (e.g., the size of the data remaining in an input buffer and/or the size of the unused portion of an output buffer), a buffer flag, or both (e.g., but without a pointer). The term size of the data may refer to the total size of the data, for example, not the size of each element of multiple elements of data. In one embodiment, the number of entries in the storage (e.g., array 216 and array 226) for the input buffer descriptors and input buffer response descriptors is that same as the number of input buffers used (e.g., for a context) for example, allocated. Additional or alternatively, the number of entries in the storage (e.g., array 220 and array 230) for the output buffer descriptors and output buffer response descriptors is that same as the number of output buffers used (e.g., for a context), for example, allocated. In one embodiment, a buffer may be a circular buffer. Although the pointers are shown as adjacent to the arrays, other embodiments may store the pointers elsewhere, e.g., local to an accelerator. The above may be part of a context structure 205, e.g., with a single context for each compression and/or decompression operation on an entire data set. A context structure may include static context data 207, for example, including one or more of: a field for a job description (e.g., job identification (ID) or other work descriptor(s)), options, configurations, stateful save area pointer, and global control flags.

As an example, processing device 206 may receive a request for an operation, (e.g., a compression or decompression operation) on an input data set. Certain examples herein discuss a compression operation. In one embodiment of a decompression operation, the examples for a compression operation may be applicable, e.g., other than output buffers may be consumed faster than input buffers for decompression while compression may consume input buffers faster than output buffers, e.g., the hardware operation of the interface between the processing device and the accelerator may be the same in either case.

In one embodiment of sending a request to an accelerator, processing device 206 may allocate and fill 232 some number of input buffers 208, write 236 LastValidIn pointer 214, and write 234 (e.g., size) information in each respective entry for each buffer in input buffer descriptor array 216.

An input buffer descriptor entry (e.g., Buff Desc 0) in input buffer descriptor array 216 may include the corresponding information for that input buffer (e.g., Input Buffer 0) in input buffers 208. For example, an input buffer response descriptor entry (e.g., RespBuff Desc 0) in input buffer response descriptor array 226 may include the corresponding information for that (e.g., same) input buffer (e.g., Input Buffer 0) in input buffers 208. The variable $N_{IN}$ is used in reference to the input buffer and $N_{OUT}$ is used in reference to the output buffer in certain embodiments. In one embodiment, $N_{IN}$ and $N_{OUT}$ may be different values, for example, the number of input buffers and the number of output buffers being used (e.g., allocated) may be different. In one embodiment, $N_{IN}$ and $N_{OUT}$ may be the same value (e.g., N), for example, the number of input buffers and the number of output buffers being used (e.g., allocated) may be the same.

An output buffer descriptor entry (e.g., Buff Desc 0) in output buffer descriptor array 220 may include the corresponding information for an output buffer (e.g., Output Buffer 0) in output buffers 210. For example, an output buffer response descriptor entry (e.g., RespBuff Desc 0) in output buffer response descriptor array 230 may include the corresponding information for that (e.g., same) output buffer (e.g., output Buffer 0) in output buffers 210. In one embodiment, the processing device is to check that all buffers previously sent (e.g., for a context) have been consumed before reusing. Processing device 206 may write 236 LastValidIn pointer 214 to indicate the last input buffer of input buffers 208 the processing device has provided with (e.g., valid) data.

The processing device may allocate one or more output buffers of output buffers 210 to receive the output of the accelerator. For example, processing device may write 238 LastValidOut pointer 218 and (e.g., size) information for each entry (e.g., Buff Desc 0) of output buffer descriptor array 220. LastValidOut may indicate the last output buffer that the processing device has provided that the accelerator may write output data. The processing device may write a go command (e.g., via an interconnect or port, such as, but not limited to, a memory-mapped input/output (MMIO) port) to the accelerator to indicate that new data is available. Notifications (e.g., asynchronous with the operations of the processing device) from the accelerator may indicate to the processing device (e.g., requestor) that the accelerator has updated the last consumed input (LastConsumedIn) and/or last consumed output (LastConsumedOut) pointers. Processing device may proceed (e.g., asynchronously of this notification) to add more (e.g., input and/or output) buffers if space is available or wait for free buffers to become available if all are in use. In one embodiment, a processing device may decode and/or execute an instruction to cause a request (e.g., a command packet) to be sent to an accelerator. In one embodiment, the allocation of input buffers and allocation of output buffers is managed (e.g., initiated) by software running on a processor, for example, based on workload considerations, e.g., throughput, number of threads running simultaneously, latency tolerance, etc. In one embodiment, the number of input buffers is any number between 1 and 16 or 4 and 16. In one embodiment, the number of output buffers is any number between 1 and 16 or 4 and 16.

Accelerator 202 may receive a command packet 232, e.g., from the processing device 206. Command packet 232 may be read (e.g., by the accelerator) and values updated, e.g., in accelerator command queue 203, and the request in the command packet may be placed at the end of the queue (e.g., in an accelerator's static random-access memory (SRAM) or system random access memory (RAM)). In one embodiment, a first queue entry may be read and processed. The accelerator 202 may check, e.g., for a specific context, for valid input and output buffers, for example, by checking LastConsumed with LastValid for input and/or output. In one embodiment, if LastValidIn does not equal LastConsumedIn, then there are input buffer(s) available to work on. In one embodiment, if LastValidOut does not equal LastConsumedOut, then there are output buffer(s) available to store output data in. In one embodiment, if there is not both input data available and output data space available, then the accelerator may check for additional updates to input and output buffers and proceed if possible. In one embodiment, if there is both input data and output data space available, the accelerator may consume input and generate output until the supply of either input buffers or output buffers is exhausted. The accelerator 202 may (e.g., on consumption) update flags and/or data out sizes in response descriptors 222 and/or update LastConsumedIn 224 and LastConsumedOut 228 variables. Accelerator may check for additional updates to input and output buffers and proceed if possible. Accelerator may send a notification (e.g., interrupt or other signal) to the processor. In one embodiment, a notification includes one or more of the following: an (e.g., general) processor (e.g., CPU) interrupt, cache line access signal (e.g., monitor and wait), and memory write to an area the processor is periodically checking (e.g., polling). A notification may be sent between an accelerator and a processor through a dedicated communication channel (e.g., line) and/or a queuing interface.

As another example, assuming a data set of a total size (e.g., a 200 KB file), each input buffer (e.g., storage) may be less than the total size (e.g., each input buffer may store 64 KB of data). In one stateful embodiment, the consumption of input buffers 208 and output buffers 210 are independent of the buffer submission mechanism. The input buffers may be completely decoupled from the output buffers. Data buffers may be owned by the accelerator until they are completely consumed or until the accelerator (e.g., logic thereof) makes the decision to return them, e.g., for use by another context. In one embodiment, the operation of the accelerator on a particular context is not tied directly to a request and/or response model. For example, multiple sets of data may be enqueued on a single context (e.g., given enough buffers, buffer descriptors storage, and buffer response descriptors storage) and the accelerator may be free to work on that context's data independently of the submission order of data with respect to other contexts. For example, the accelerator may prevent swapping between contexts because of the decoupling of submission and execution order. Within a context, the operation (e.g., compression or decompression) may be executed in submission order, but no ordering with other contexts may be required.

Initialization:

In this example, in response to the request for an operation on a data set, a processing device 206 (e.g., core or CPU) may allocate 232 and initialize 234 all memory to be used for operation of the accelerator 202, e.g., including space for each context structure 205 which may include the corresponding input buffer descriptor array 216 for input buffers 208, output buffer descriptor array 220 for output buffers 210, input buffer response descriptor array 226 for input buffers 208 and output buffer response descriptor array 230 for output buffers 210. In one embodiment, the pointer 214 to the initial last valid input buffer (LastValidIn) may be set 236 to the index of 3 (e.g., the fourth element in the index), for example, as the 200 KB file will take up all of three 64 KB buffers and part of the fourth 64 KB buffer (e.g., element 4 which is index 3 when 0 is the first index), the pointer 218 to the last valid output buffer (LastValidOut) may be set 238 to the index of 3 as well, the pointer 224 to the last consumed input buffer (LastConsumedIn) may be set 242 to the index of 3 as well, and the pointer 228 to the last consumed output buffer (LastConsumedOut) may be set 248 to the index of 3 as well. The length field in the input buffer descriptors for buffers 0 and 1 may each be set to 64 KB. In one embodiment, the initial setting of the pointers of the last valid input buffer (LastValidIn) and the last consumed input buffer (LastConsumedIn) to a same index value (e.g., 3 in the example above) and the initial setting of the pointers of the last valid output buffer (LastValidOut) and the last consumed output buffer (LastConsumedOut) to a (e.g., different than for the input buffers) same index value (e.g., 3 in the example above) indicates there is no valid input or output data available, respectively.

In one embodiment, after initialization, only the accelerator may update the LastConsumed values (e.g., LastConsumedIn 224 and LastConsumedOut 228). The processing device 206 may update the LastValid values (e.g., LastValidIn 214 and LastValidOut 218). The processing device 206 may allocate (e.g., at 234 & 236) four buffer descriptors for input and output, e.g., so that N=4 (e.g., at 234 and 240). The pointers to memory areas with input and output data may be written and then remain the same for this example, but may in general use be changed, e.g., prior to each submission to the accelerator to perform the operation. In this example, four memory buffers may be allocated 232 in input buffer 208 (e.g., N=4) and also may be allocated 252 in output buffer 210 (e.g., also N=4). These buffers may be dynamically allocated and change throughout execution, e.g., with the buffer descriptors and/or buffer response descriptors modified to point to that buffer(s) before the accelerator is signaled that a buffer is ready for use.

In this example, LastValidOut 218 may then be set to 2, e.g., indicating that output buffers 0, 1, and 2 are now valid to receive output. The processing device 206 may load (e.g., copy) the first subset of data (e.g., a 64 KB block) into input buffer 0 and the second subset (e.g., 64 KB block) into input buffer 1 of input buffers 208, for example, when only the first two subsets of the input data are currently available. In one embodiment, the two subsets are continuous (e.g., adjacent) data from the input data.

Operation:

The processing device 206 (e.g., processor or CPU) may send a request (e.g., command packet 232) to the accelerator 202 to operate on input data. The context structure pointer thereof may indicate to the accelerator which operational context has been updated. In one embodiment of operation, the accelerator receives the command packet 232. Command packet may include one or more of: control parameter(s), LastValidIn pointer (e.g., to store in field 214), LastValidOut pointer (e.g., to store in field 218), and context structure pointer. The request (e.g., command packet 232) may be put into an internal queue, e.g., accelerator command queue 203, for later processing. If the request is the first request, it may be (e.g., immediately) removed from the queue to begin processing. In one embodiment, accelerator 202 may check that that LastConsumedIn and LastValidIn are not equal indicating that input data is available. In one embodiment, accelerator 202 may check that LastConsumedOut and LastValidOut are not equal indicating that output buffer space is available. When input data is available (e.g., and output buffer space is available), the accelerator may read the first buffer of input buffer 208 that includes new input data and process the data (e.g., to compress or decompress) and output the generated output data to the first buffer of output buffer 210 that includes space to receive (e.g., part of) the data. In this example, the two input buffers 0 and 1 may be fully exhausted and the output data therefrom may fit within the first output buffer 0.

In one embodiment, no more input data may be available at this time. Note that it is possible in certain embodiments that the processing device 206 may have incremented LastValidIn if there were input buffers available to load with data (e.g., by the processing device 206). For example, the accelerator 202 may (e.g., periodically) check if the processing device 206 has sent more data and updated LastValidIn. In one embodiment, when no more input data is available at this time, the accelerator 202 may not make any more forward progress on this particular context and may send a signal or interrupt to the processing device 206, e.g., and processing device 206 may check the status. In certain embodiments, another (e.g., queued) context may now proceed for execution on the accelerator 202 if that context has data to process. The processing device 206 may receive the signal or interrupt and check the response descriptors LastConsumedIn pointer. For example, if the processing device in this example finds that LastConsumedIn is now set to 1 which is equal to LastValidIn, it may indicate that both input buffers previously provided have been consumed and there are once again 4 empty input buffers. For example, if the processing device in this example checks the LastConsumedOut pointer and finds that it is still set to 3, it may indicate that no output buffer has been returned to the processing device, e.g., there is data in the output buffer 0 but it has not been returned to the processing device. In one embodiment, this operation assumes that the buffer is to be completely filled before being returned, e.g., unless the context has indicated that all the data has been sent in which case a partial buffer is to be returned. In certain embodiments, how full a buffer is before being returned is a tunable parameter, e.g., a buffer may be returned when full or at a certain level that is less than full.

In this example, assuming the processing device 206 now fills input buffer 2 with 64 KB of data and input buffer 3 with the remaining 4 KB of data which completes the 200 KB file. The length field in the input buffer descriptors for buffers 2 and 3 may be set to 64 KB and 4 KB, respectively. The processing device may write the input buffer descriptor pointers and flags for input buffers 2 and 3. An end of file (EOF) flag may be set in the flag field of the input descriptor entry for buffer 3. In one embodiment, if output buffers still are available, no output buffers are added. The processing device may update the LastValidIn pointer to 3. The LastConsumedIn may now be 1 (e.g., as mentioned previously) meaning there are now 2 input buffers available. The processing device may send a command packet 232 to the accelerator 202 indicating new input data is available. These input buffers then may be processed, e.g., as discussed above. The output data from the (e.g., compression) operation of the two new buffers may be appended to output buffer 0 until it is full. In one embodiment, any further output data may be loaded (e.g., stored) into output buffer 1. The LastConsumedOut pointer may be updated to 0 when output buffer 0 is full.

The (e.g., compression) operation may continue until all input data is exhausted and in this example, output buffer 1 may be partially filled. Because the EOF flag was set in the input buffer descriptor for buffer 3, the accelerator may set the EOF flag in the output buffer descriptor for output buffer 1. The processing device may use this information to determine that the operation has completed on this data set (e.g., context). The accelerator may set LastConsumedOut to 1 when it is no longer to write data to output buffer 1, e.g., even though output buffer 1 is not full, because the stream is finished. The accelerator may load (e.g., update) 246 an entry (e.g., RespBuff Desc 0) in the input buffer response descriptor array 226 for an input buffer (e.g., Input Buffer 0) of input buffers 208, e.g., to indicate how much input data remains in the input buffer and/or any flags. The accelerator may load (e.g., update) 250 an entry (e.g., RespBuff Desc 0) in the output buffer response descriptor array 230 for an output buffer (e.g., Output Buffer 0) of output buffers 210, e.g., to indicate how much output data space remains or how much data has been stored in that output buffer and/or any flags (e.g., if EOF).

LastConsumedIn may be set to 3 indicating that buffer 2 and buffer 3 were fully consumed. The accelerator may send a signal or interrupt to the processing device. The processing device may read LastConsumedIn and determine that it equals LastValidIn and thus all input was consumed. The processing device may read the LastConsumedOut and read a 1. This may indicate output buffers 0 and 1 were consumed and contain valid output data. The processing device may check any buffer descriptor flags and data length values for output buffers 0 and 1. The processing device may detect that output buffer 0 is full with 64 KB of data and output buffer 1 has 17 KB of data with the EOF flag set indicating this completes the operation on this data set (e.g., context). The processing device may read the output data from the output buffers and utilize (e.g., move) it, for example, according to the needs of the application. For example, the processing device 206 may check the LastValidOut 218 and LastConsumedOut 228 to determine if an output buffer has (e.g., new) data from the accelerator 202.

Context Teardown:

The processing device may determine that this (e.g., compression or decompression) operation has completed. In general, (e.g., circular) buffer arrays may have been used many times and operation between the accelerator and the processing device may be asynchronous, e.g., with simultaneous operation of the accelerator and the processing device. In one embodiment, the processing device may either delete the context entirely by freeing all memory and sending a command to the device to tear down the internal context state in the device, or it may setup additional buffers and start a new sequence of operations on the same context.

The above examples discuss a processing device updating LastValidIn and LastValidOut directly in memory with the command packet indicating to the accelerator that updates have occurred to the input and output buffers. In this case, the accelerator may (e.g., periodically) check for new input and output buffer space, e.g., and begin processing when it is able once the command packet is received. In this case, the command packet may be considered a go (e.g., start) command. An alternative embodiment is to transmit the LastValidIn and LastValidOut values in the command packet itself. In this case, the accelerator may then read the values from the command packet and update the internal state. In another embodiment, the buffer descriptors may be updated through command packets. The choice of what is written directly and what is transmitted through command packets may be selectable, e.g., at manufacture or run-time.

Figure 3:
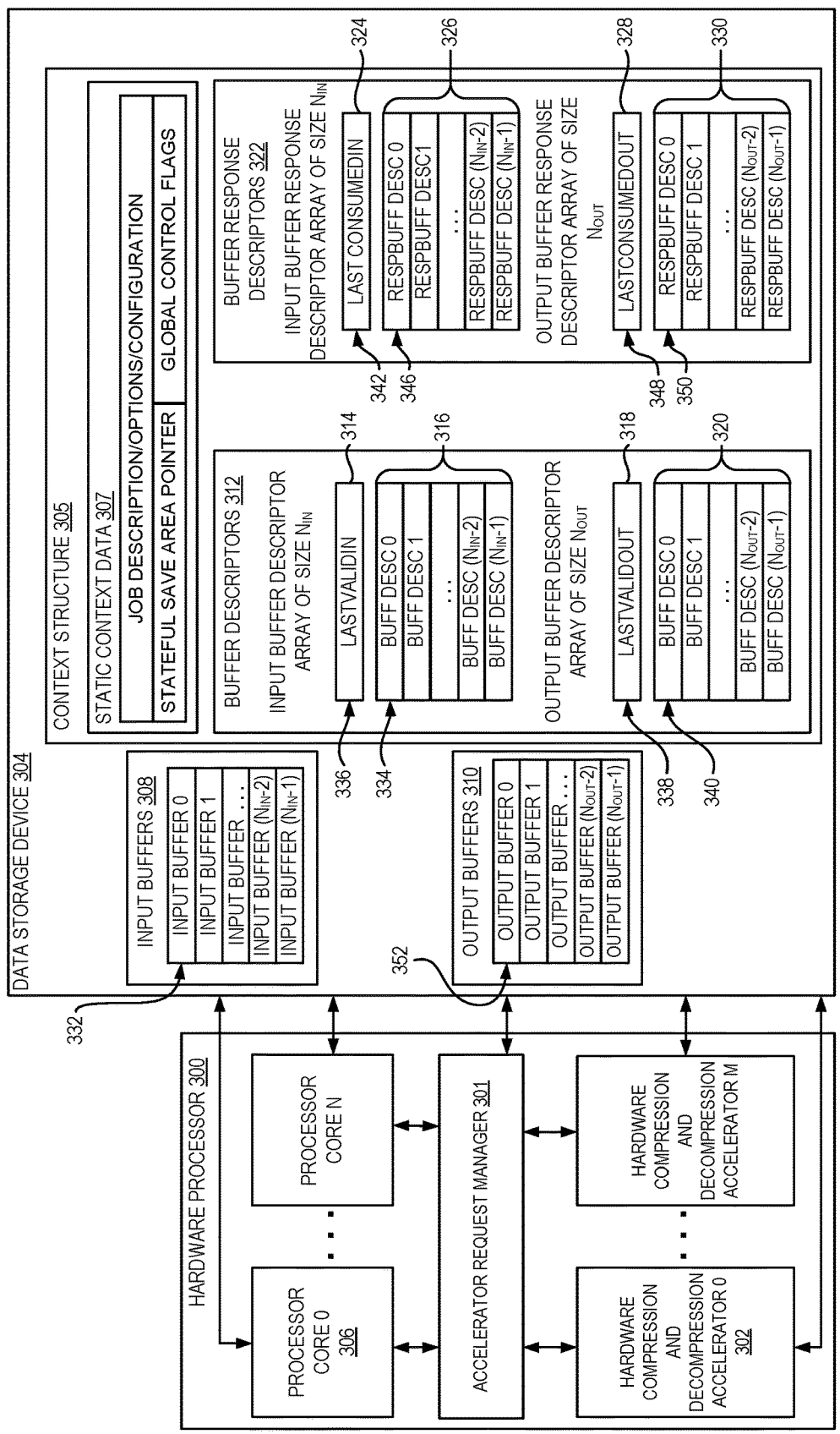
FIG. 3 illustrates a hardware processor including a plurality of cores, a hardware accelerator request manager, and hardware compression and decompression accelerators according to embodiments of the disclosure.

FIG. 3 illustrates a hardware processor 300 including a plurality of cores 0 to N (e.g., processor core 0 (306)), a hardware accelerator request manager 301, and hardware compression and decompression accelerators 0 to M (e.g., hardware accelerator 0 (102)) according to embodiments of the disclosure. In one embodiment, hardware accelerator request manager 301 may determine which operation (e.g., job) of multiple (e.g., compression or decompression) operations (e.g., jobs) is sent to a particular hardware compression and decompression accelerator. Although multiple cores (e.g., requestors of the accelerator to perform an operation) are depicted, in one embodiment, a single core may couple (e.g., connect) to hardware accelerator request manager 301, for example, to send data to a particular hardware compression and decompression accelerator. Note that similarly numbered components may include similar or the same functionality as those components in the other figures. For example, accelerator 302 in FIG. 3 may perform an operation in response to a request from core 306, as accelerator 102 in FIG. 1 may perform an operation in response to a request from core 106 and/or accelerator 202 may perform an operation in response to a request from processing device 206 (e.g., core or processor). Hardware accelerator request manager 301 may communicate with data storage device 304 and/or accelerators (e.g., 0 to M).

One embodiment of a hardware acceleration request manager may be discussed in reference to its interaction with the processor, for example, by looking at the application programming interface (API) between the software drivers (e.g., of a software program requesting an operation) and the accelerator hardware. Initially, a (e.g., compression or decompression) job may be created for the accelerator, for example, by being offloaded from the processor. In one embodiment, the software, processor, and/or the accelerator may reference this job via some unique job identification (e.g., Job ID). The job may have an associated context structure 305, for example, which is then used for the lifetime of the job, e.g. a job may be the compression or a decompression of a (e.g., large) file via numerous calls to the accelerator. In one embodiment, the context structure 305 may include one or more of: static context data 307, for example, job information (e.g., a work descriptor), an (e.g., circular) array of buffer descriptors 312 corresponding to the input and output buffers, and an (e.g., circular) array of buffer response descriptors 322 corresponding to the input and output buffers. The input buffer descriptor array 316 (and/or the LastValidIn pointer 314) and the output buffer descriptor array 320 (and/or the LastValidOut pointer 318) may be grouped together in one portion (e.g., as shown stored in data storage device 304), stored local to the processor core 306 (e.g., to be updated by the processor), or they may be separate and stored apart. The input buffer response descriptor array 326 (and/or the LastConsumedIn pointer 324) and the output buffer response descriptor array 330 (and/or the LastConsumedOut pointer 328) may be grouped together in one portion (e.g., as shown stored in data storage device 304), stored local to the accelerator 302 (e.g., to be updated by the accelerator), or they may be separate and stored apart. In one embodiment, buffer descriptors (e.g., Buff Desc) describe the content of corresponding input and output buffers, which may include one or more of the following fields: pointer (e.g., pointer to the particular buffer), data size, and flags. Size may include bits or bytes passed in and/or space available to store data. Flags may be buffer based flags. In one embodiment, response buffer descriptors (e.g., RespBuff Desc) may include one or more of the following fields: no pointer, a size, and flags. Size may include the bits or bytes passed into an output buffer and/or remaining in an input buffer. Flag may indicate an EOF, e.g., the last byte of output in response to a flush or EOF command in an input buffer descriptor. In this example, the output buffer may be considered consumed on reading of the flag and the LastValidOut value may be incremented to reflect that this output buffer is complete, e.g., no further data is loaded into the output buffer regardless of whether it is actually full (e.g., where full refers to all memory in the buffer is used). In one embodiment, the buffer descriptors and response descriptors are matched one to one for each buffer. In certain embodiments, buffers and their descriptors may be included for each of multiple input data sets (e.g., streams) and/or multiple output data sets (e.g., streams).

Once a job has been created, the processor (e.g., software running on the processor) may allocate buffers for the job. As the accelerator processes the data in the input buffers and/or the processor consumes (e.g., reads or destroys) the output data, the input and/or output buffers may be returned to software, e.g., via a notification mechanism, such as, but not limited to, interrupts and polling.

Buffer Submission: a job may contain a number of data sets (e.g., streams), for example, 2 or 3, e.g., one input and one or two output. Each data set (e.g., stream) may be represented by an (e.g., circular array) set of buffer descriptors and response descriptors. In one embodiment, each buffer descriptor entry may contain one or more of the following: a pointer to the respective buffer, the size of the buffer (e.g., the amount of data for an input buffer and the amount of space for an output buffer), and flags. For example, the buffers may be fixed in length, e.g., with their size and/or location determined at job creation time. Input and/or output buffers may be sent to the accelerator by writing to some address, for example, with the information accordingly added for each buffer as an entry in the descriptors (e.g., in a circular array). In one embodiment, the information includes the number of buffers added. Each such buffer descriptor may be implicitly owned by the hardware accelerator after this point, e.g., such that the processor and/or software may not modify that data until the buffer is returned, e.g., by the accelerator to the processor and/or software.

Note that writing to the hardware (e.g., to the descriptors 312, 322) the number of buffers added to each job (e.g., context) is one example to submit buffers to an accelerator. In another embodiment, the number of buffers in each job (e.g., context) may be written into the context structure, e.g., and the processor may send a request signal to the accelerator that the accelerator check the context structure for this information.

Response Mechanism: the response mechanism may be that some data is written to a specific memory address, e.g., where the details of the response are in the data that was written. Exemplary mechanisms as to how the processor is to view (e.g., be notified of) this data includes, but is not limited to: doing a (e.g., software) poll of that address, to monitor that address and wait until it is updated, or an (e.g., user-level) interrupt may instruct the thread to execute on the accelerator to wake up and view the address.

Buffer Correlation: in one embodiment, each accelerator (e.g., of multiple accelerators) may have one input stream and one or two output streams. When there are two output streams, there may be one primary output stream and one secondary output stream. For example, for LZ4 compression, the primary output stream may be the compressed data steam, and the secondary output stream may be a fix-up stream. In one embodiment, the distinction is that the primary stream may or may not use buffers, and the secondary stream may use buffers. In one embodiment, a primary stream may generate more output than the secondary stream. In one example, the primary output buffers may be filled during the operation, e.g., except for a buffer used for the end of the stream. In one embodiment, a buffer-centric viewpoint is that input and output buffers are not correlated, for example, one input buffer may generate data into two (e.g., or more) output buffers. For example, one output buffer may have loaded (e.g., contain) data generated (e.g., by an accelerator) from two (e.g., or more) input buffers. However, in one embodiment, the two (e.g., or more) output buffers (e.g., primary and secondary) may be correlated, for example, one output buffer may make reference(s) to data in the other output buffer, and the operation (e.g., compression or decompression) may be delayed if the output rates are different. For example, if the primary output buffers were filled at a rate of one buffer per input buffer, but the secondary output buffers were filled at a rate of one buffer per every two input buffers, the situation may occur where the system (e.g., software and/or hardware) has a primary output buffer(s) to process, but it may not do so because it is waiting for the corresponding secondary output buffer, for example, where the hardware is not to generate another secondary output buffer because it is waiting for another primary output buffer to fill. In certain embodiments, the primary and secondary buffers are not synced. In one embodiment, the processor (e.g., accelerator) may stop processing when either the available primary buffers or the available secondary buffers are exhausted. One embodiment herein with multiple output buffers includes returning a secondary output buffer whenever a primary output buffer is returned and/or when a secondary output buffer fills up.

In one embodiment, the primary output stream is an internal stream, and return buffers that are not full are to be retuned, for example, in multiple block (e.g., DEFLATE) compression, a primary output buffer may be returned when the end of a block is reached, e.g., so the processor may start working sooner. Certain embodiments herein may allow for the accelerator to return the size of data used and/or used for (e.g., all) buffers.

In one embodiment of returning buffers (e.g., from an acceleration operation), two types of information may be sent from the accelerator to the processing device to return buffers: (1) what buffers are being returned, and (2) how much of the buffer was used. One embodiment to do so is to have a memory region for buffer response (e.g., return) data, for example, buffer response descriptors. In one embodiment, the accelerator may (e.g., periodically) write this information, for example, along with sending a notification to the accelerator requestor (e.g., processor). In one embodiment, e.g., when the accelerator does not detect when that information is read (e.g., by hardware or software), the information may be cumulative data and not incremental data, e.g., for a context. One example mechanism for indicating which buffers are returned is through a count per stream of buffers returned, for example, where the buffer return data would consist essentially of one count per stream (e.g., 2 to 3 counts) and may be accompanied by a series of size fields, e.g., one corresponding to each buffer descriptor.

In one embodiment, a buffer-centric submission scheme may be asynchronous between input and output streams and/or buffers. In another embodiment, explicit synchronization events are to occur during compression (e.g. a flush event that is to flush all output corresponding to having consumed exactly this amount of input data). In one embodiment, a flag may be included (e.g., by the processing device or accelerator) to break the asynchronous behavior, for example, by providing the flags with each buffer that indicate to the hardware accelerator if a synchronization of data (e.g., with another stream of data) is desired, e.g., upon consumption of that buffer.

Figure 4:
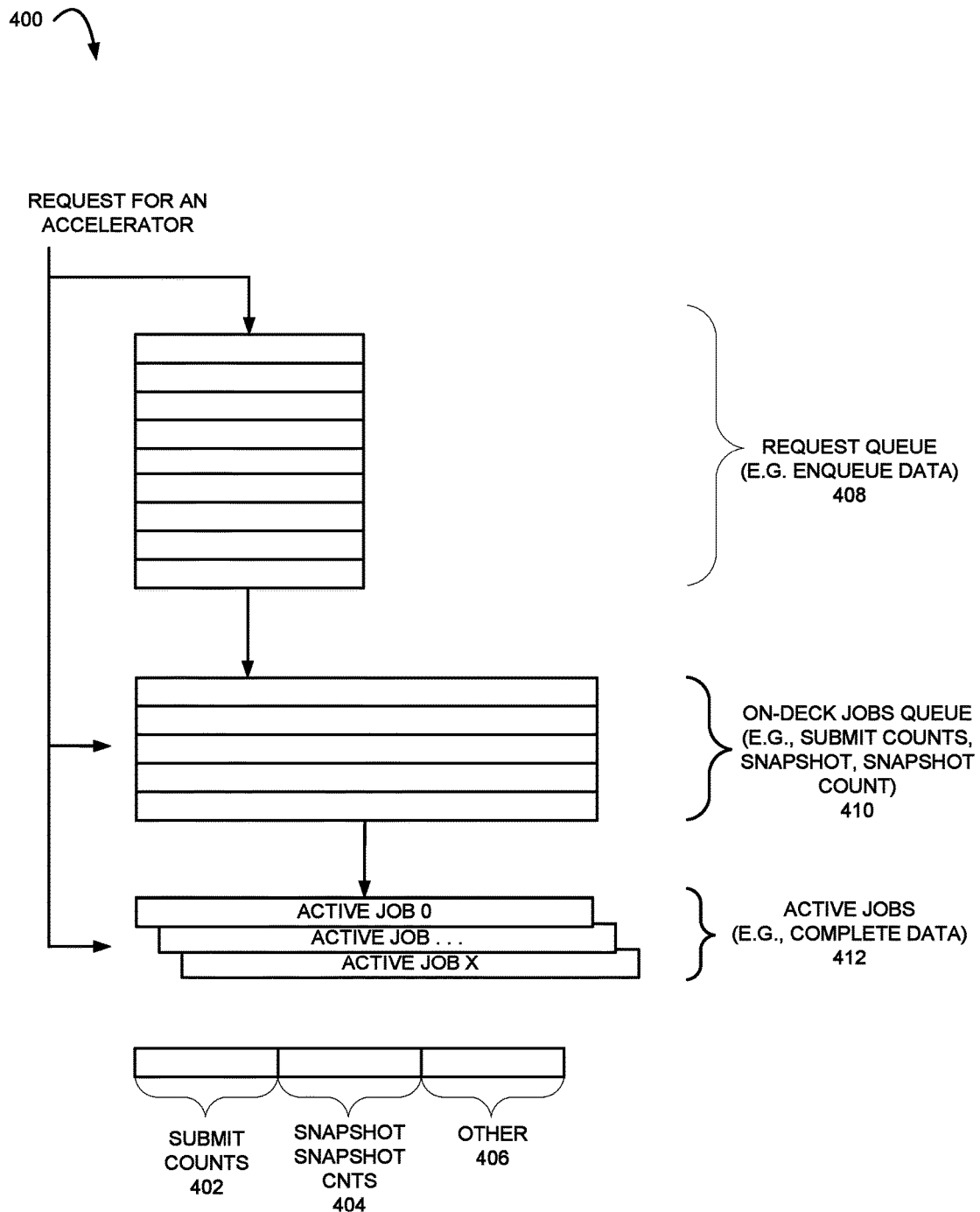
FIG. 4 illustrates a flow diagram according to embodiments of the disclosure.

FIG. 4 illustrates a flow diagram 400 according to embodiments of the disclosure. Reference below may be made to both FIGS. 3 and 4.

One example of the architecture of a hardware accelerator includes a (e.g., hardware) acceleration request manager 301 to manage requests to the accelerator or accelerators. This may be centralized (e.g., as in FIG. 3) or each accelerator may include its own acceleration request manager. In the following discussion, reference may be made to a single stream but this may be applicable to embodiments with multiple streams. The number of job requests added to the request queue or returned (e.g., to the requestor (e.g., software)) may be defined by a counter (e.g., $N_{IN}$ and/or $N_{OUT}$). The number of job requests added to the queue by the requestor (e.g., processing device or software) may be called the Submit Count 402. It may be represented by a value in the context data structure in data storage device, and may also sent to the accelerator, e.g., via the execution of an instruction to enqueue a request. At certain times, there may also be a version of the Submit Count stored within the manager 301. One embodiment may send the counts to the hardware, e.g., in the command packet, such as, but not limited to, command packet 232 in FIG. 2. In another embodiment, the counts may be stored in the context structure, e.g., only in the context structure. The return count may be the number of buffers returned to the requestor (e.g., processing device or software) by the accelerator. This may also be a value in the context data structure. There may be within the manager 301, a copy of the Buffer Descriptors 312, e.g., along with a copy of the submit count. This copy will be called the Snapshot and the Snapshot Count. The snapshot may be a copy which is out of date. The Job ID may be a combination of the Process ID and the address of the context structure. The Job ID may be stored in a context structure 305, but may (e.g., also) be stored in separate memory (e.g., internal or external) to allow the processor (e.g., accelerator) to quickly index certain data internally, for example, buffer descriptor copies. In one embodiment, buffer descriptors are stored in memory and the processor (e.g., accelerator) takes a snapshot of the state of the buffer descriptors and operates on them. The buffer descriptors may be updated by the processor while the accelerator is using the now stale copy. The snapshot count in one embodiment may include this (e.g., potentially) stale copy of the submission count that is stored in the context structure that is up to date. In one embodiment, there is a submission count for the input buffers and a submission count for the output buffers when the input and output buffers are decoupled. In one embodiment when input and output buffers are coupled (e.g., synced) there may be one submission count.

In one embodiment there may be a plurality of accelerators, for example, accelerators of different types, e.g., a compression accelerator, a decompression accelerator, an accelerator for each of specific compression and/or decompression algorithms. Each type may be managed separately, e.g., as described below.

There may be a set of data associated with each accelerator referred to as the active job (for example, active jobs 0 to X, e.g., stored in active jobs field 412). An active job data set may include the information to manage that job. There may be an on-deck jobs queue 410 (e.g., less than about 10, 8, 7, 6, 5, 4, or 3 entries) which may include the data from the context structure for that job (e.g. the buffer descriptor snapshot, the counts, pointers to the save/restore, etc.). In one embodiment, an (e.g., each) entry in the on-deck jobs queue includes the data to start a job on an accelerator, e.g., when an accelerator becomes available. There may be a request queue 408, e.g., of a larger size than the on-deck jobs queue 410. In one embodiment, an (e.g., each) entry in the request queue 408 may include the data for the requests that are not active or on-deck.

In one embodiment, when a request for an operation is received (e.g., a request to perform an operation by the processor and/or to be offloaded to the accelerator, the Job ID may be effectively compared to the Job ID for the active jobs 412 and the on-deck jobs queue 410. In one embodiment, if there is a match, the appropriate state is updated, for example, otherwise that request may be added to (e.g., the end of) the request queue 408. When an accelerator becomes available, there may be an on-deck job ready to be immediately started on it from the on-deck jobs queue 410. In one embodiment, when there is space in the on-deck jobs queue 410, requests may be loaded thereto from the request queue 408. In one embodiment, if the next job from the request queue 408 is not ready for an operation by the accelerator (e.g., if its input buffers are empty or output buffers are full), then the job may be stalled (or thrown away) and otherwise it may be added to the on-deck jobs queue 410. In certain embodiments, if the job is not ready for an operation by the accelerator, the job will not be ready for acceleration unless there is a later request increasing its available buffer counters. Table 1 below illustrates one example of processing a request for an accelerator by an acceleration request manger.

TABLE 1

| IF REQUEST: | REQUEST GOES TO: |
| --- | --- |
| 1 MATCHES AN ACTIVE JOB | ACTIVE JOB |
| 2 AN ACCELERATOR IS AVAILABLE, THE ON DECK JOBS QUEUE IS EMPTY, AND JOB IS READY FOR EXECUTION | ACTIVE JOB |
| 3 MATCHES AN ON DECK JOB | ON DECK JOBS QUEUE |
| 4 SPACE IS AVAILABLE IN THE ON DECK JOBS QUEUE, THE REQUEST QUEUE IS EMPTY, AND JOB IS READY FOR EXECUTION | ON DECK JOBS QUEUE |
| 5 IS OTHERWISE | REQUEST QUEUE |

In one embodiment, when a job request is being considered for insertion into the on-deck jobs queue 410 (e.g., where the request comes either directly from a request for the accelerator or from the request queue 408), initially the submit counts from the request itself may be available. In one embodiment, the submit counts are the number of available buffers submitted for both input and output, for example, as another way of handling LastValidIn and LastValidOut. There may be a submission count (e.g., for each of input and output) and the processor (e.g., accelerator) may track a consumed count for each of input and output. In certain embodiments, the next step may be to read the relevant portions of the context structure, e.g., to view the return counts (e.g., the pointers) and/or buffer descriptors. In one embodiment, if any of the return counts match the corresponding submit count, then that queue may be empty, and the job is not ready for acceleration, e.g., that that request may be dropped. If the queue is not empty, the data may be written into the on-deck jobs queue 410. This copy of the Buffer Descriptors and Submit Counts may be referred to as a snapshot. In one embodiment, submit counts 402 may be a (e.g., rolling) counter that is at least one counter tick greater that the number of buffers in the input stream (e.g., array). There may be a submit count for every input stream, e.g., unless the buffers are synchronized. In one embodiment, snapshot counts are the last snapshot of the submission counts that the accelerator (e.g., or accelerator request manager) read from memory. In one embodiment, submission counts are computed from job request data, e.g., so the processor (e.g., accelerator) determines whether the snapshot data is stale. Other data 406 may include a context pointer to read the context information.

In one embodiment, every job in the on-deck jobs queue 410 may be ready for acceleration, e.g., the job's snapshot has at least one input buffer with data and one output buffer with available space in every stream. There may be two sets of counts in each entry in the on-deck jobs queue (e.g., and for each the Active Job): one set of counts for the snapshot, and a second set of counts for the latest known counts. In one embodiment, initially these may be the same, but if a request comes in that matches an entry in the on-deck jobs queue, the submit counts may increase, e.g., whereas the snapshot counts do not. This may indicate that the snapshot is out of date, e.g., that there are more buffers available than what is indicated in the snapshot.

In one embodiment for updating a snapshot, when the number of entries (e.g., in the snapshot) in any input buffer or output buffer goes to 0 or 1, and the corresponding submit count 402 (e.g., as updated by a request) is greater than 1, the request manager and/or accelerator may reread the submit counts 402 and buffer descriptors and buffer response descriptors, and then update the (e.g., stale) snapshot accordingly. In one embodiment, this may be triggered by either the accelerator finishing use of a buffer (e.g., and returning it) to reduce the counts, or by a request matching this job and increasing the submit counts 402.

FIG. 5 illustrates a flow diagram 500 of an acceleration operation according to embodiments of the disclosure. Depicted flow 500 includes receiving at least one of a compression thread and a decompression thread at a hardware processor 502, offloading the at least one of the compression thread and the decompression thread to a hardware compression and decompression accelerator 504, and executing the at least one of the compression thread and the decompression thread on the hardware compression and decompression accelerator to consume input data and generate output data (e.g., wherein the hardware compression and decompression accelerator is coupled to a plurality of input buffers to store the input data, a plurality of output buffers to store the output data, an input buffer descriptor array with an entry for each respective input buffer, an input buffer response descriptor array with a corresponding response entry for each respective input buffer, an output buffer descriptor array with an entry for each respective output buffer, and an output buffer response descriptor array with a corresponding response entry for each respective output buffer) 506.

In one embodiment of a stateless compression and decompression operation, there may be no dependence between blocks of input such that all blocks so that are all treated as independent jobs, e.g., instead of one stream of multiple blocks in one job. In one embodiment, e.g., when the input size is known when compressing, the output size when decompressing may also then be known. For example, if all input blocks to be compressed are of one size (e.g., 64 KB), then the output sizes after compression may be multiple different sizes. After a subsequent decompression, the blocks may all be the uncompressed size (e.g., 64 KB) again. Therefore, buffer sizes may be chosen based on the knowledge of the sizes of data when they were compressed. Thus the input and output buffers may be used in a 1:1 fashion for stateless, for example, for every input block there may be one output block used, e.g., regardless of whether compressing or decompressing. Buffer sizes may be chosen such that they are sized to hold the output data whether the data is being compressed or decompressed.

In one embodiment, stateful hardware and/or a stateful method may be used for a stateless operation. For example, a flag may be set to indicate to the accelerator that the job is stateless which may cause the accelerator to treat each buffer independently and/or to write output of each operation on an input buffer to its own unique output buffer. For example, a stateless implementation may not use the buffer descriptor and/or response descriptor arrays. In one embodiment, instead of using the buffers, a (e.g., each) command packet may include information describing an input and output buffer for an operation. This may include the pointers to the input and output buffers, the buffer sizes, and job flags. The command packet may be placed on an internal queue (e.g., request queue 408) and pulled off and executed. The command packet may (e.g., also) contain a response location to write a completion notice for that request.

In one embodiment, a hardware processor includes a core to execute a thread and offload at least one of a compression thread and a decompression thread, and a hardware compression and decompression accelerator to execute the at least one of the compression thread and the decompression thread to consume input data and generate output data, wherein the hardware compression and decompression accelerator is coupled to a plurality of input buffers to store the input data, a plurality of output buffers to store the output data, an input buffer descriptor array with an entry for each respective input buffer, an input buffer response descriptor array with a corresponding response entry for each respective input buffer, an output buffer descriptor array with an entry for each respective output buffer, and an output buffer response descriptor array with a corresponding response entry for each respective output buffer. The hardware compression and decompression accelerator may compare an index for a last valid input entry of the input buffer descriptor array to an index for a last consumed input response entry of the input buffer response descriptor array and compare an index for a last valid output entry of the output buffer descriptor array to an index for a last consumed output response entry of the output buffer response descriptor array to determine when the at least one of the compression thread and the decompression thread is to execute to consume input data to generate output data. The processor and/or core may allocate the plurality of input buffers, load the plurality of input buffers with the input data, and load the entries in the input buffer descriptor array for each respective input buffer. The processor and/or core may allocate the plurality of output buffers for the output data and load the entries in the output buffer descriptor array for each respective output buffer. The hardware compression and decompression accelerator may load the plurality of output buffers with the output data and load the corresponding response entries in the output buffer response descriptor array for each respective output buffer consumed. The hardware compression and decompression accelerator may load the corresponding response entries in the input buffer response descriptor array for each respective input buffer consumed. The entries in the input buffer descriptor array may each include a size of the input data stored in the respective input buffer, the corresponding response entries in the input buffer response descriptor array each include a size of the input data remaining in the respective input buffer, the entries in the output buffer descriptor array may each include a size of the respective output buffer available to store output data, and the corresponding response entries in the output buffer response descriptor array may each include a size of the output data stored in the respective output buffer. The input data may be a stateful stream of data.

In another embodiment, a method includes receiving at least one of a compression thread and a decompression thread at a hardware processor, offloading the at least one of the compression thread and the decompression thread to a hardware compression and decompression accelerator, and executing the at least one of the compression thread and the decompression thread on the hardware compression and decompression accelerator to consume input data and generate output data, wherein the hardware compression and decompression accelerator is coupled to a plurality of input buffers to store the input data, a plurality of output buffers to store the output data, an input buffer descriptor array with an entry for each respective input buffer, an input buffer response descriptor array with a corresponding response entry for each respective input buffer, an output buffer descriptor array with an entry for each respective output buffer, and an output buffer response descriptor array with a corresponding response entry for each respective output buffer. The method may include comparing an index for a last valid input entry of the input buffer descriptor array to an index for a last consumed input response entry of the input buffer response descriptor array and comparing an index for a last valid output entry of the output buffer descriptor array to an index for a last consumed output response entry of the output buffer response descriptor array to determine when the at least one of the compression thread and the decompression thread is to execute to consume input data to generate output data. The method may include allocating the plurality of input buffers, loading the plurality of input buffers with the input data, and loading the entries in the input buffer descriptor array for each respective input buffer. The method may include allocating the plurality of output buffers for the output data and loading the entries in the output buffer descriptor array for each respective output buffer. The method may include loading the plurality of output buffers with the output data and loading the corresponding response entries in the output buffer response descriptor array for each respective output buffer consumed. The method may include loading the corresponding response entries in the input buffer response descriptor array for each respective input buffer consumed. The method may include providing one or more of the following: the entries in the input buffer descriptor array that each include a size of the input data stored in the respective input buffer, the corresponding response entries in the input buffer response descriptor array that each include a size of the input data remaining in the respective input buffer, the entries in the output buffer descriptor array that each include a size of the respective output buffer available to store output data, and the corresponding response entries in the output buffer response descriptor array that each include a size of the output data stored in the respective output buffer. The input data may be a stateful stream of data.

In yet another embodiment, a system includes a hardware processor to execute a thread and offload at least one of a compression thread and a decompression thread, and a hardware compression and decompression accelerator to execute the at least one of the compression thread and the decompression thread to consume input data and generate output data, wherein the hardware compression and decompression accelerator is coupled to a plurality of input buffers to store the input data, a plurality of output buffers to store the output data, an input buffer descriptor array with an entry for each respective input buffer, an input buffer response descriptor array with a corresponding response entry for each respective input buffer, an output buffer descriptor array with an entry for each respective output buffer, and an output buffer response descriptor array with a corresponding response entry for each respective output buffer. The hardware compression and decompression accelerator may compare an index for a last valid input entry of the input buffer descriptor array to an index for a last consumed input response entry of the input buffer response descriptor array and compare an index for a last valid output entry of the output buffer descriptor array to an index for a last consumed output response entry of the output buffer response descriptor array to determine when the at least one of the compression thread and the decompression thread is to execute to consume input data to generate output data. The hardware processor may allocate the plurality of input buffers, load the plurality of input buffers with the input data, and load the entries in the input buffer descriptor array for each respective input buffer. The hardware processor may allocate the plurality of output buffers for the output data and load the entries in the output buffer descriptor array for each respective output buffer. The hardware compression and decompression accelerator may load the plurality of output buffers with the output data and load the corresponding response entries in the output buffer response descriptor array for each respective output buffer consumed. The hardware compression and decompression accelerator may load the corresponding response entries in the input buffer response descriptor array for each respective input buffer consumed. The entries in the input buffer descriptor array may each include a size of the input data stored in the respective input buffer, the corresponding response entries in the input buffer response descriptor array may each include a size of the input data remaining in the respective input buffer, the entries in the output buffer descriptor array may each include a size of the respective output buffer available to store output data, and the corresponding response entries in the output buffer response descriptor array may each include a size of the output data stored in the respective output buffer. The input data may be a stateful stream of data.

In another embodiment, a hardware processor includes means to execute a thread and offload at least one of a compression thread and a decompression thread, and means to execute the at least one of the compression thread and the decompression thread to consume input data and generate output data, wherein the means to execute the at least one of the compression thread and the decompression thread is coupled to a plurality of input buffers to store the input data, a plurality of output buffers to store the output data, an input buffer descriptor array with an entry for each respective input buffer, an input buffer response descriptor array with a corresponding response entry for each respective input buffer, an output buffer descriptor array with an entry for each respective output buffer, and an output buffer response descriptor array with a corresponding response entry for each respective output buffer.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2015; and see Intel® Architecture Instruction Set Extensions Programming Reference, August 2015).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
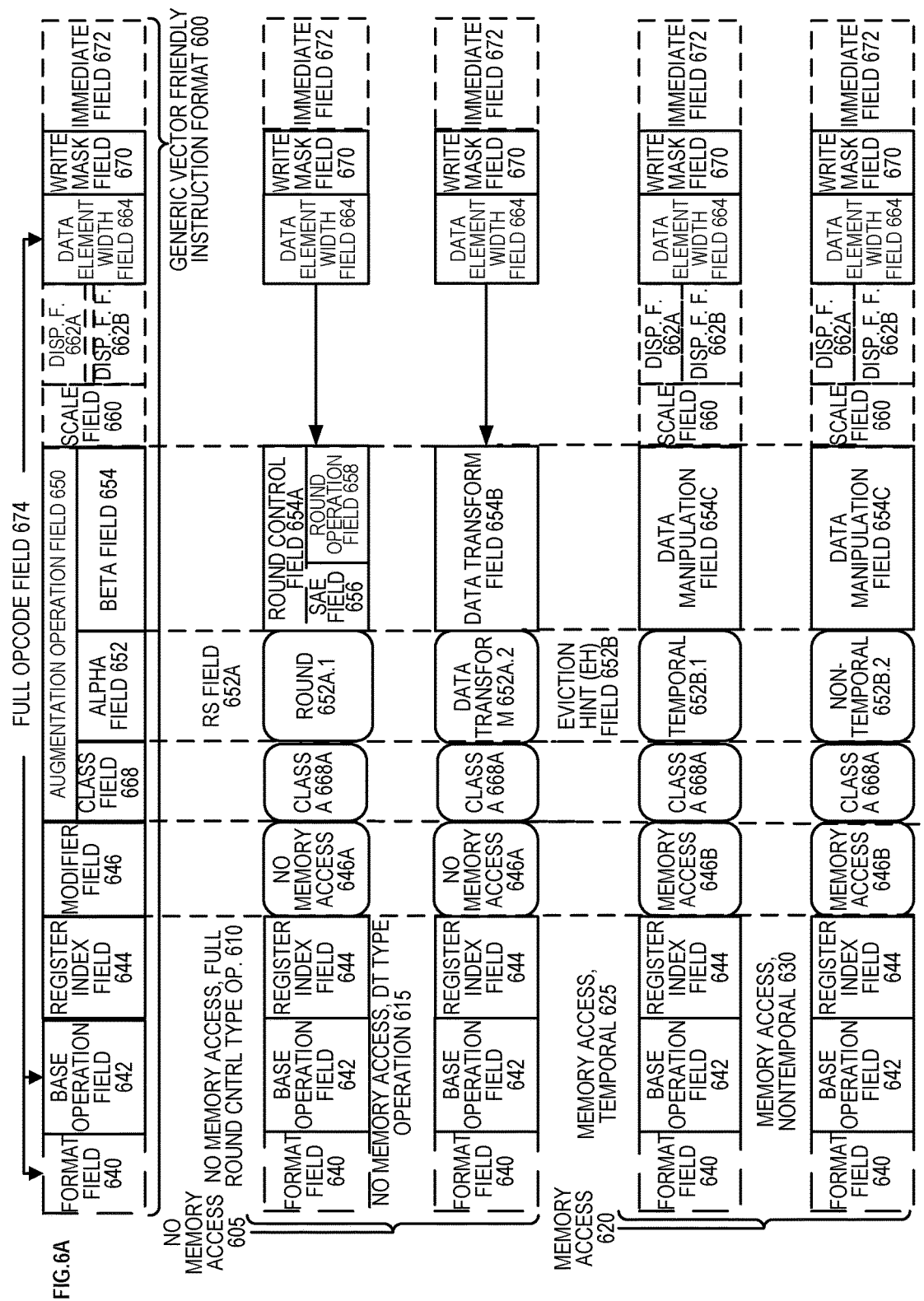
FIG. 6A is a block diagram illustrating a generic vector friendly instruction format and class A instruction templates thereof according to embodiments of the disclosure.
Figure 6B:
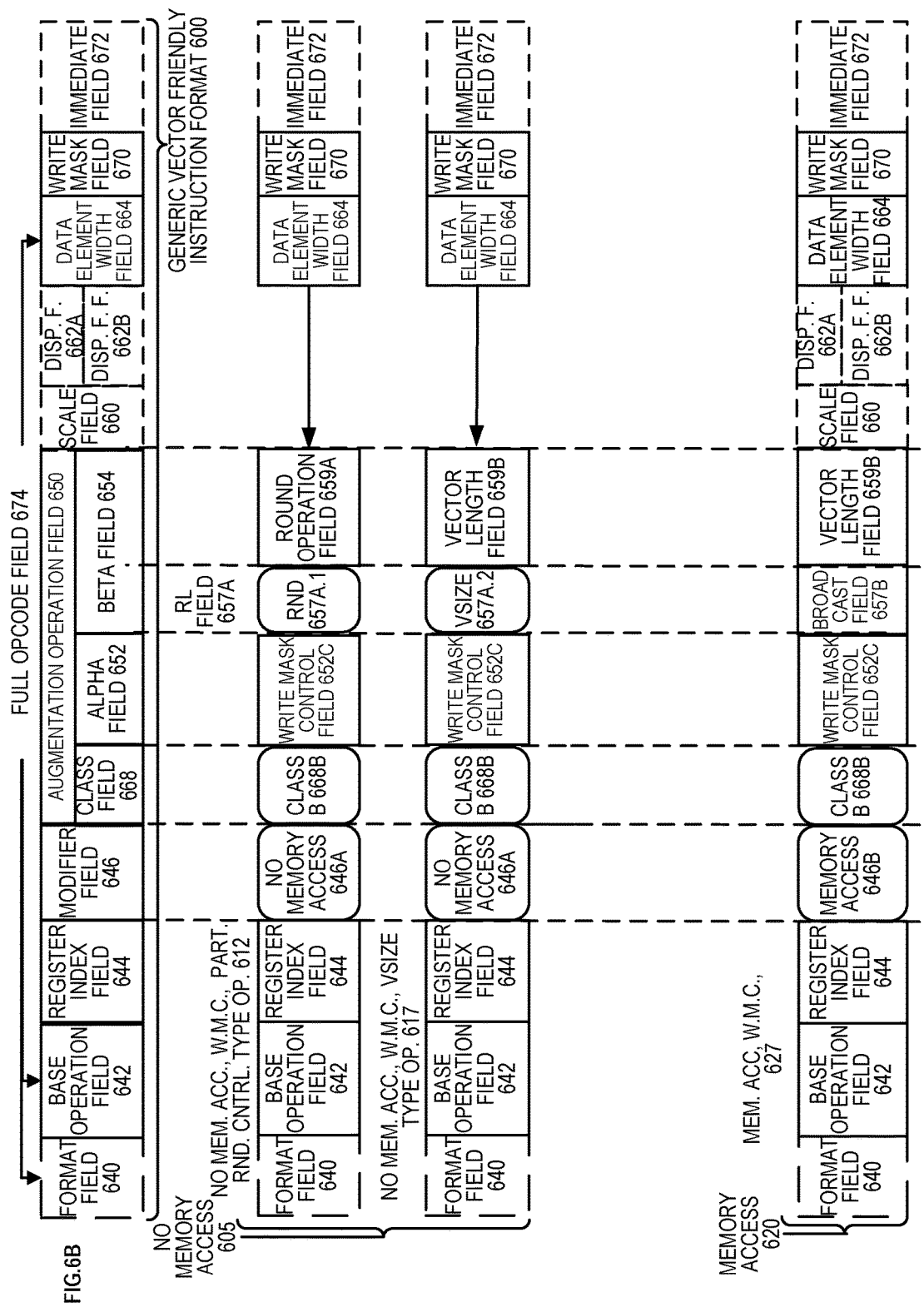
FIG. 6B is a block diagram illustrating the generic vector friendly instruction format and class B instruction templates thereof according to embodiments of the disclosure.

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*\text{index}+\text{base}$).

Displacement Field 662A—its content is used as part of memory address generation (e.g., for address generation that uses $2^{scale}*\text{index}+\text{base}+\text{displacement}$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.0 668 Class field (EVEX byte 2, bit [2]—U)—If EVEX.0=0, it indicates class A or EVEX.U0; if EVEX.0=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]—SSS, also known as $EVEX.s_{2-0}$, $EVEX.r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
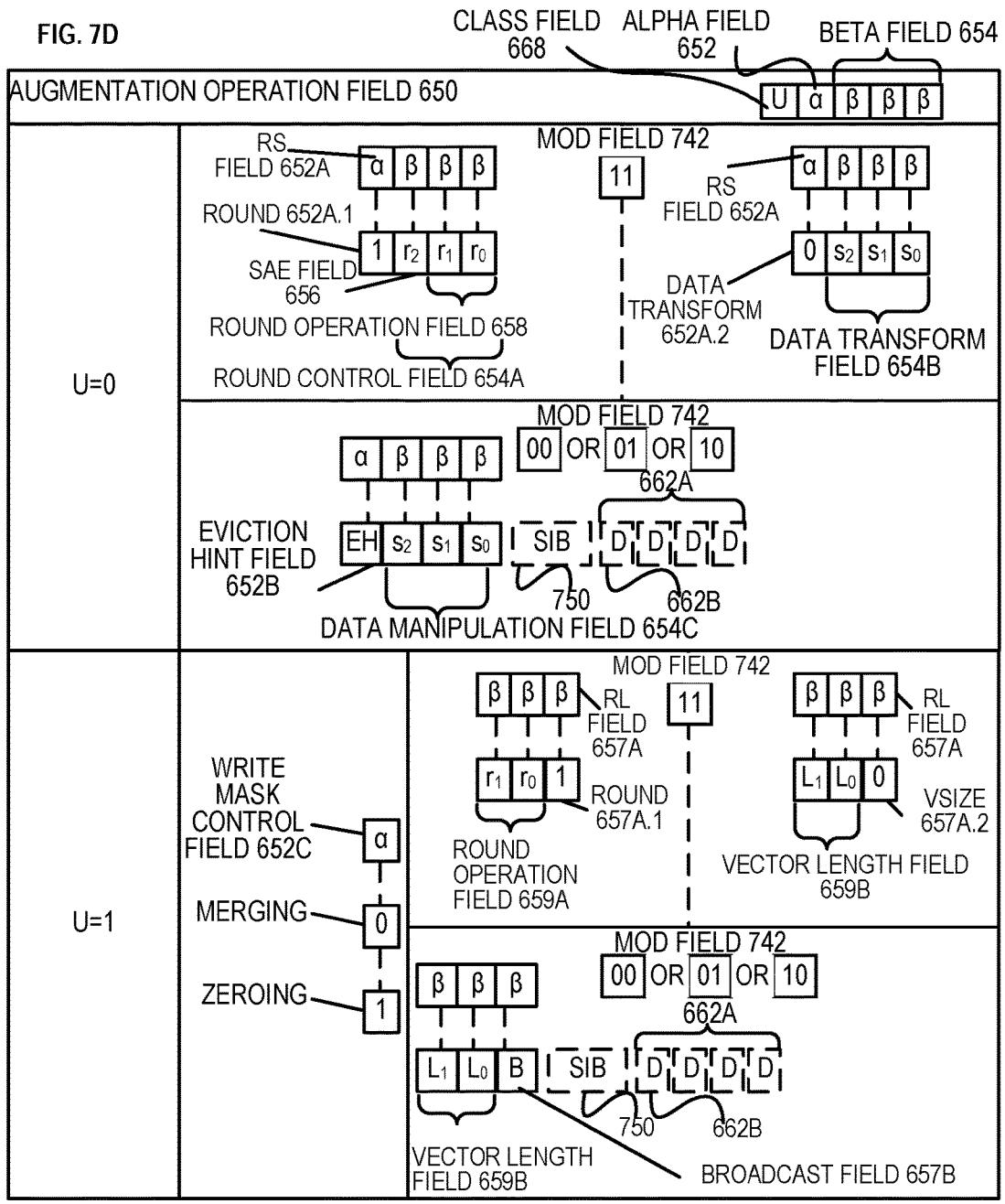
FIG. 7D is a block diagram illustrating the fields of the specific vector friendly instruction format in FIG. 7A that make up the augmentation operation field 650 according to one embodiment of the disclosure.

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

Figure 8:
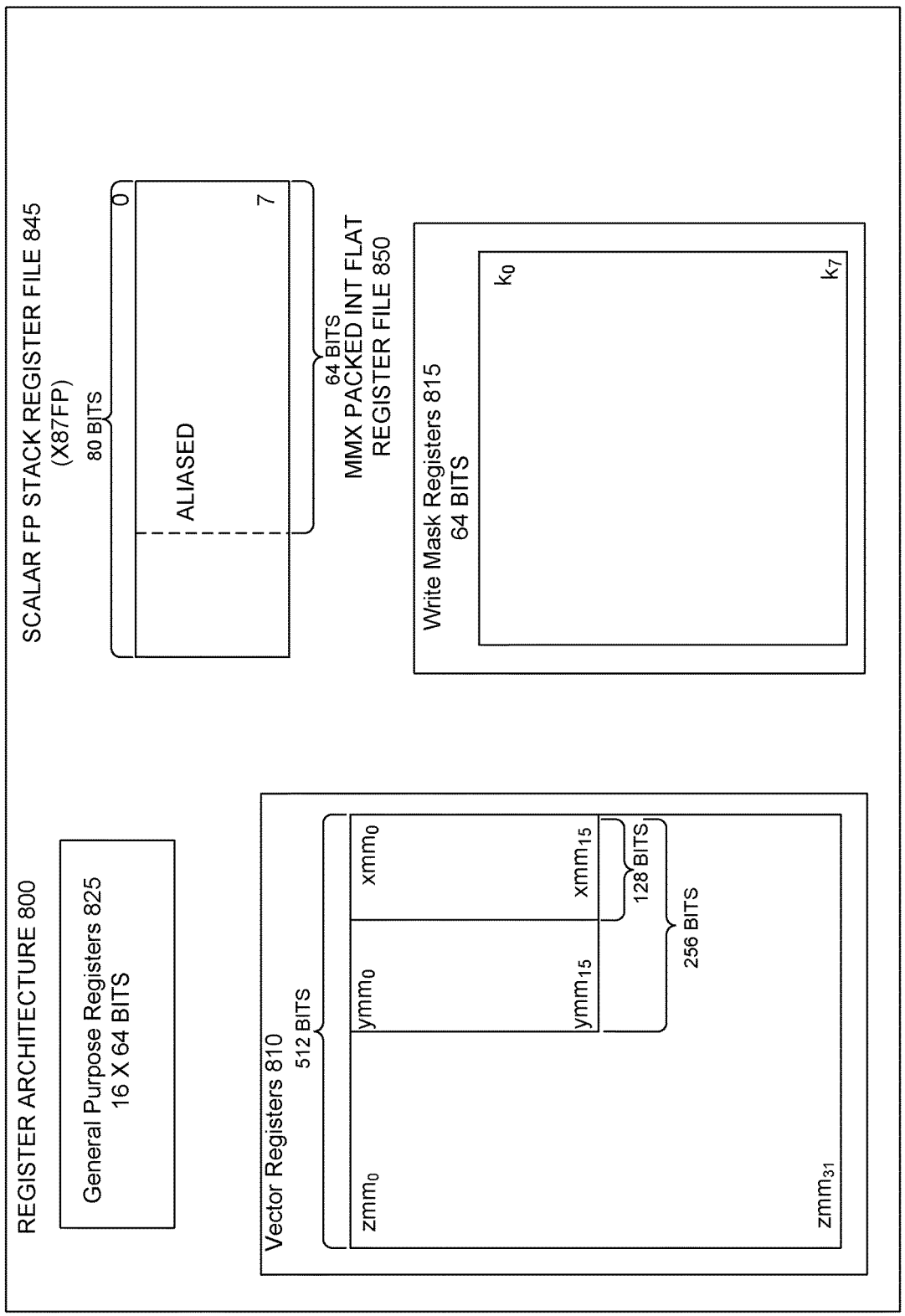
FIG. 8 is a block diagram of a register architecture according to one embodiment of the disclosure

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/ execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
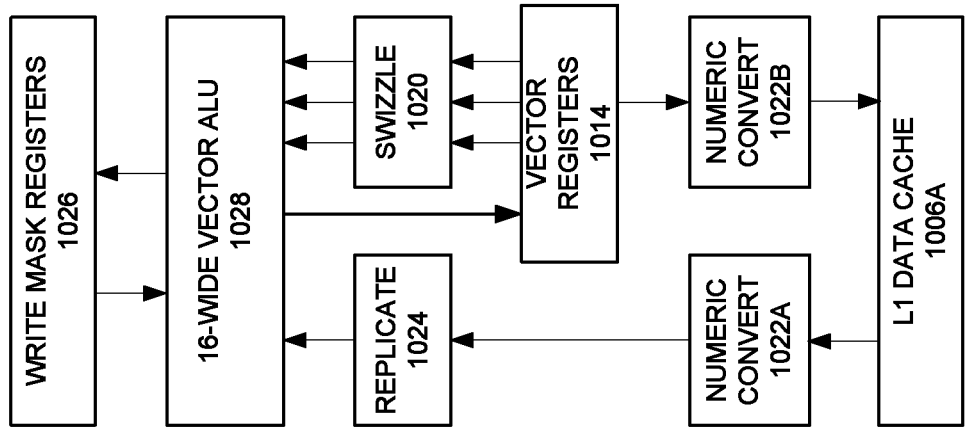
FIG. 10B is an expanded view of part of the processor core in FIG. 10A according to embodiments of the disclosure.
Figure 10A:
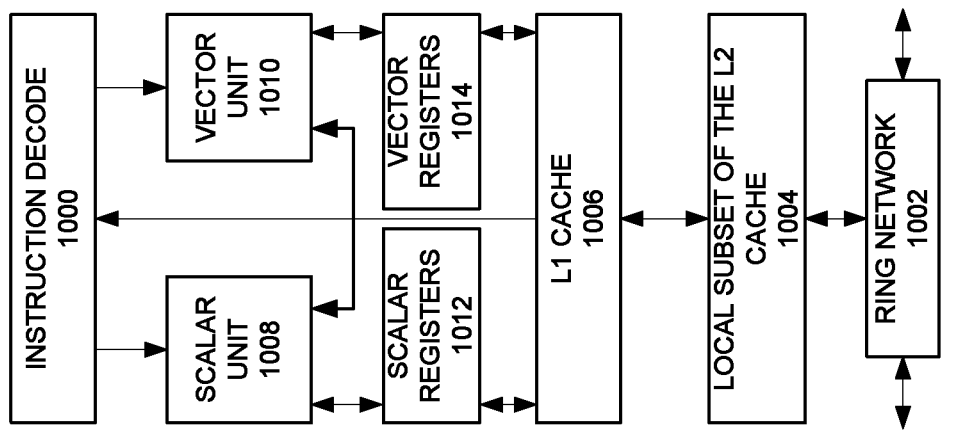
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
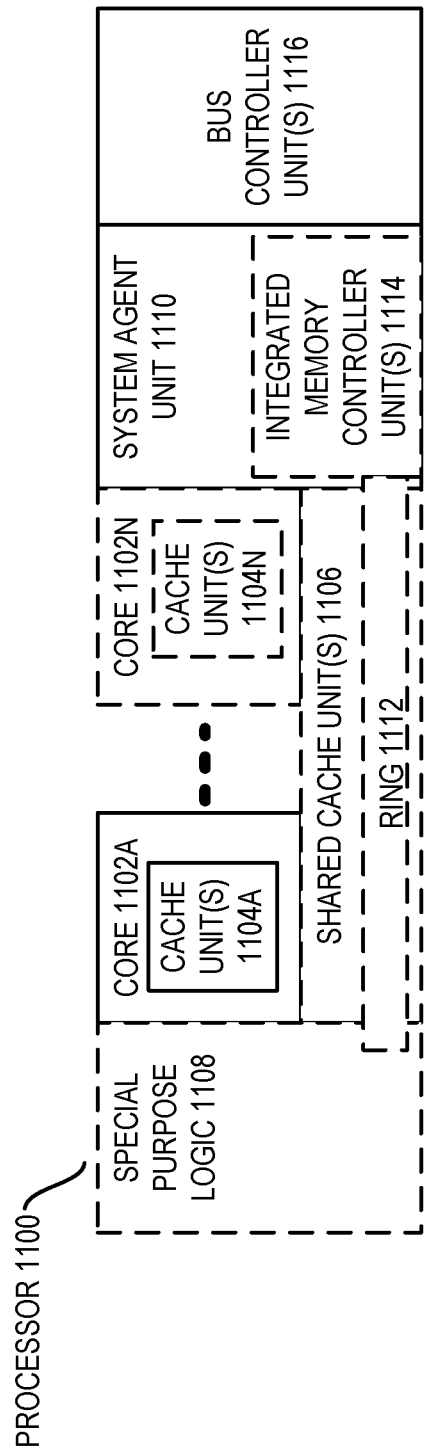
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
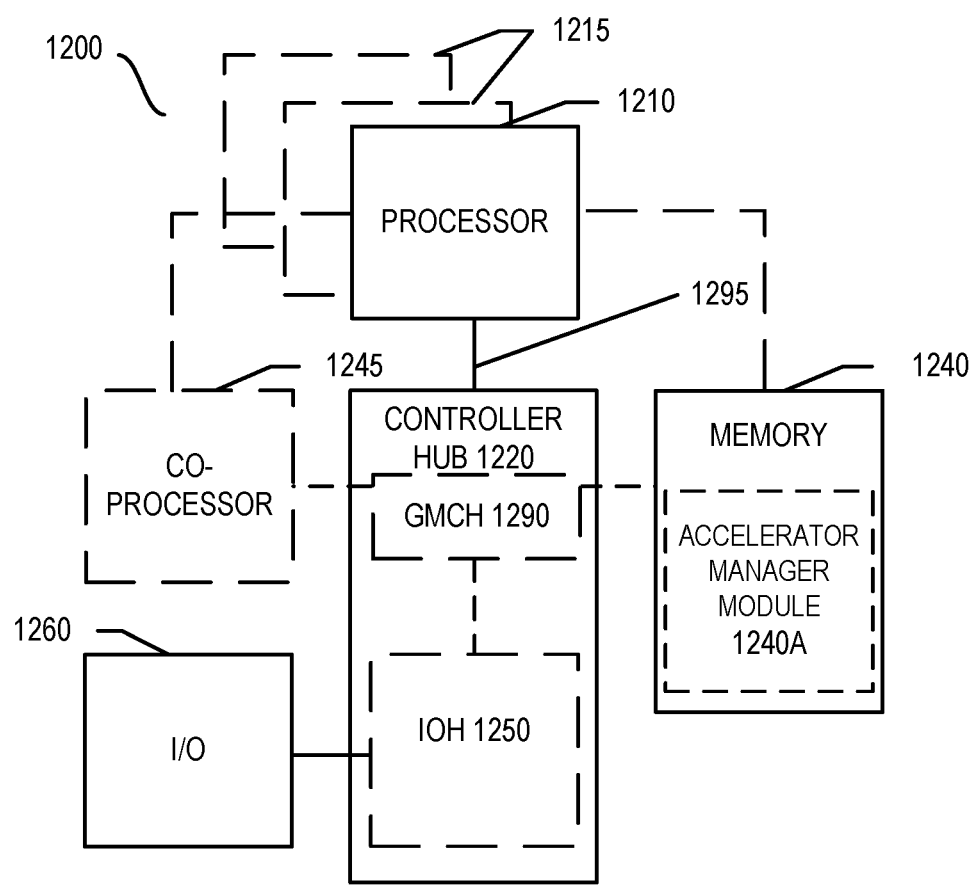
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include an accelerator manager module 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
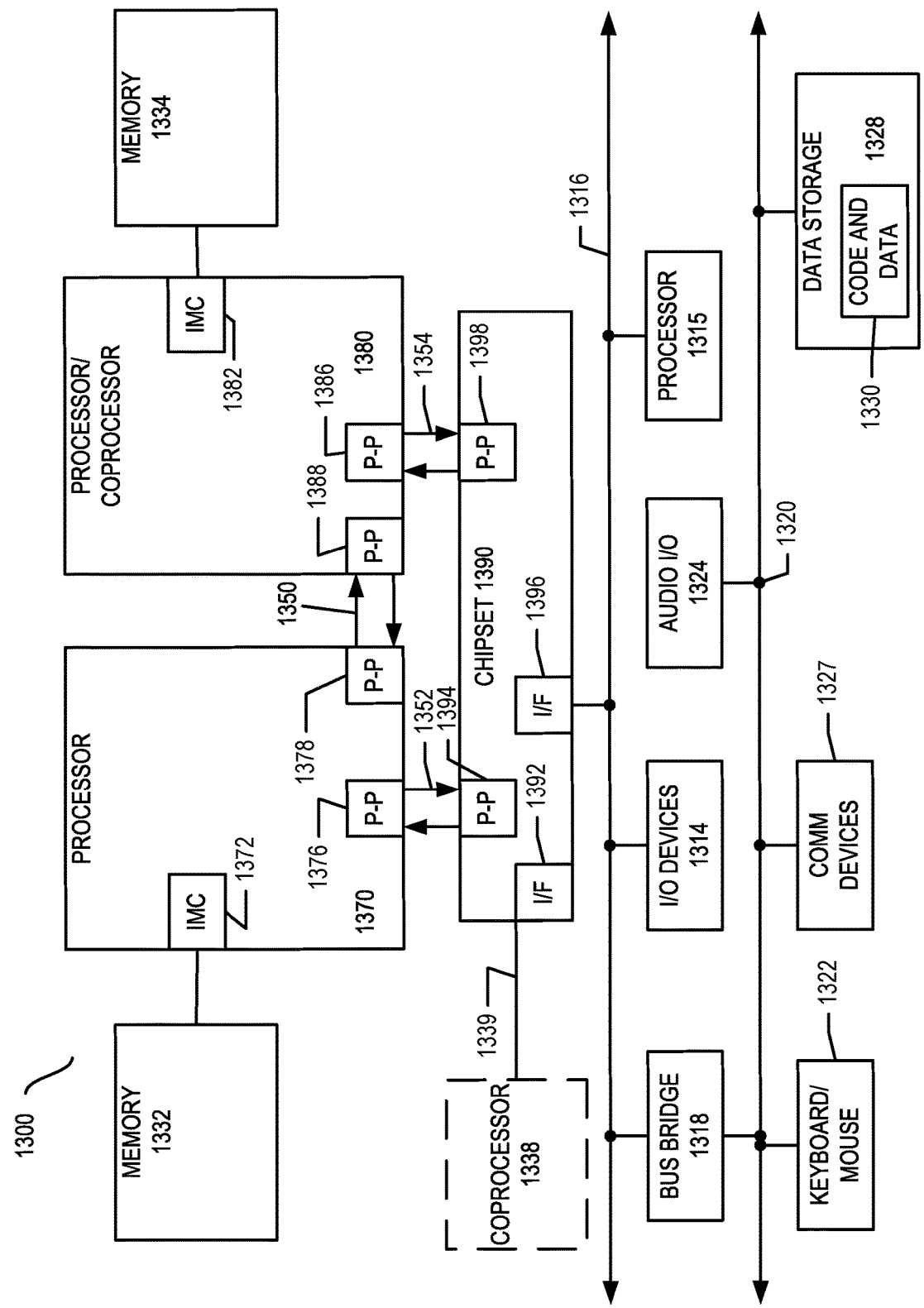
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
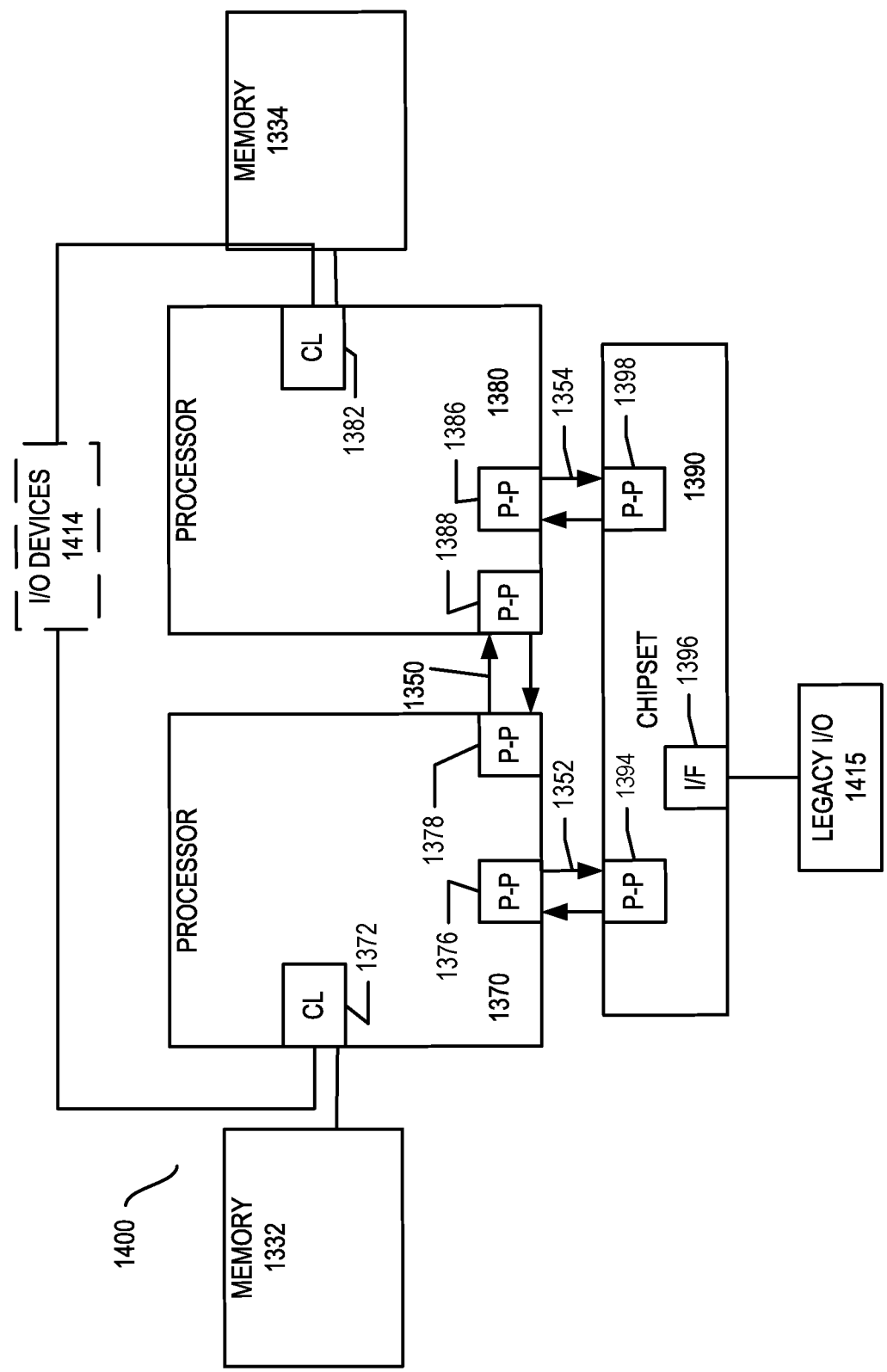
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
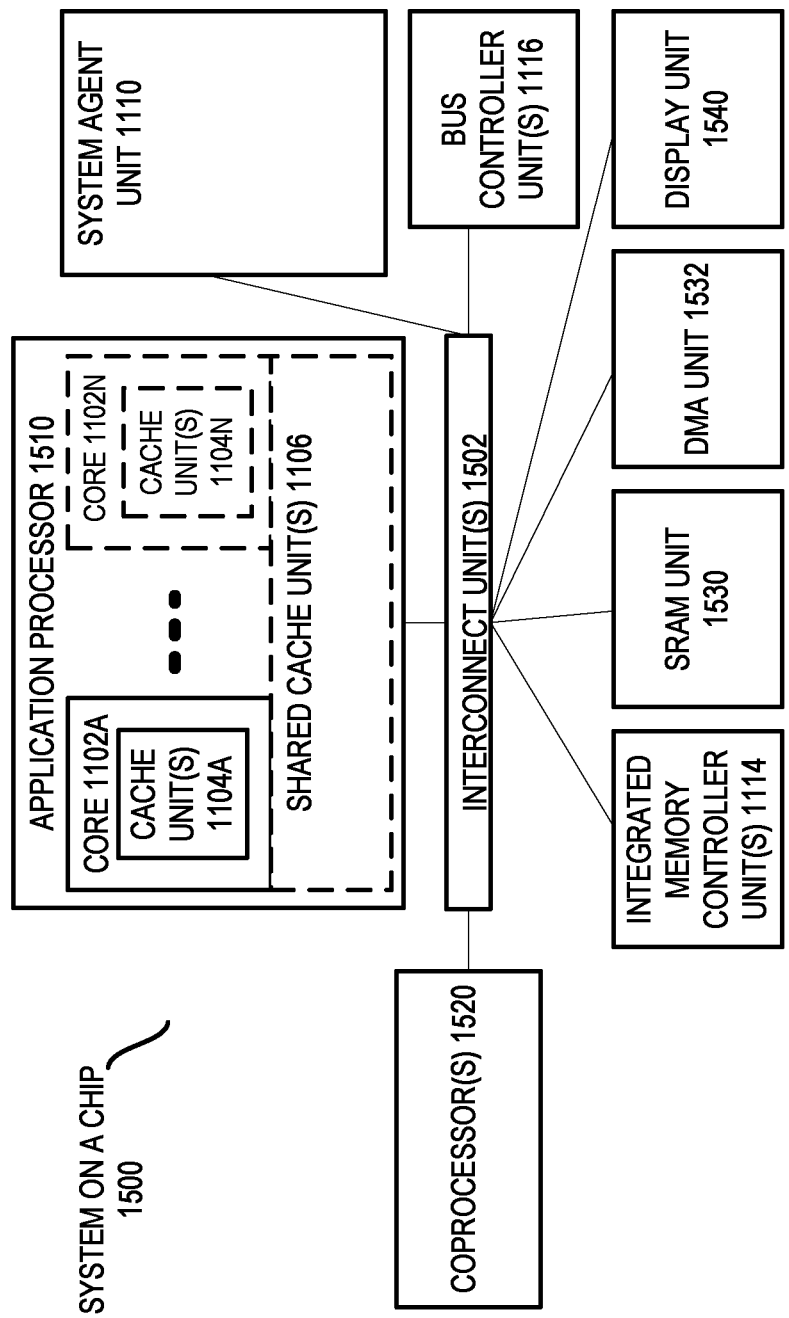
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
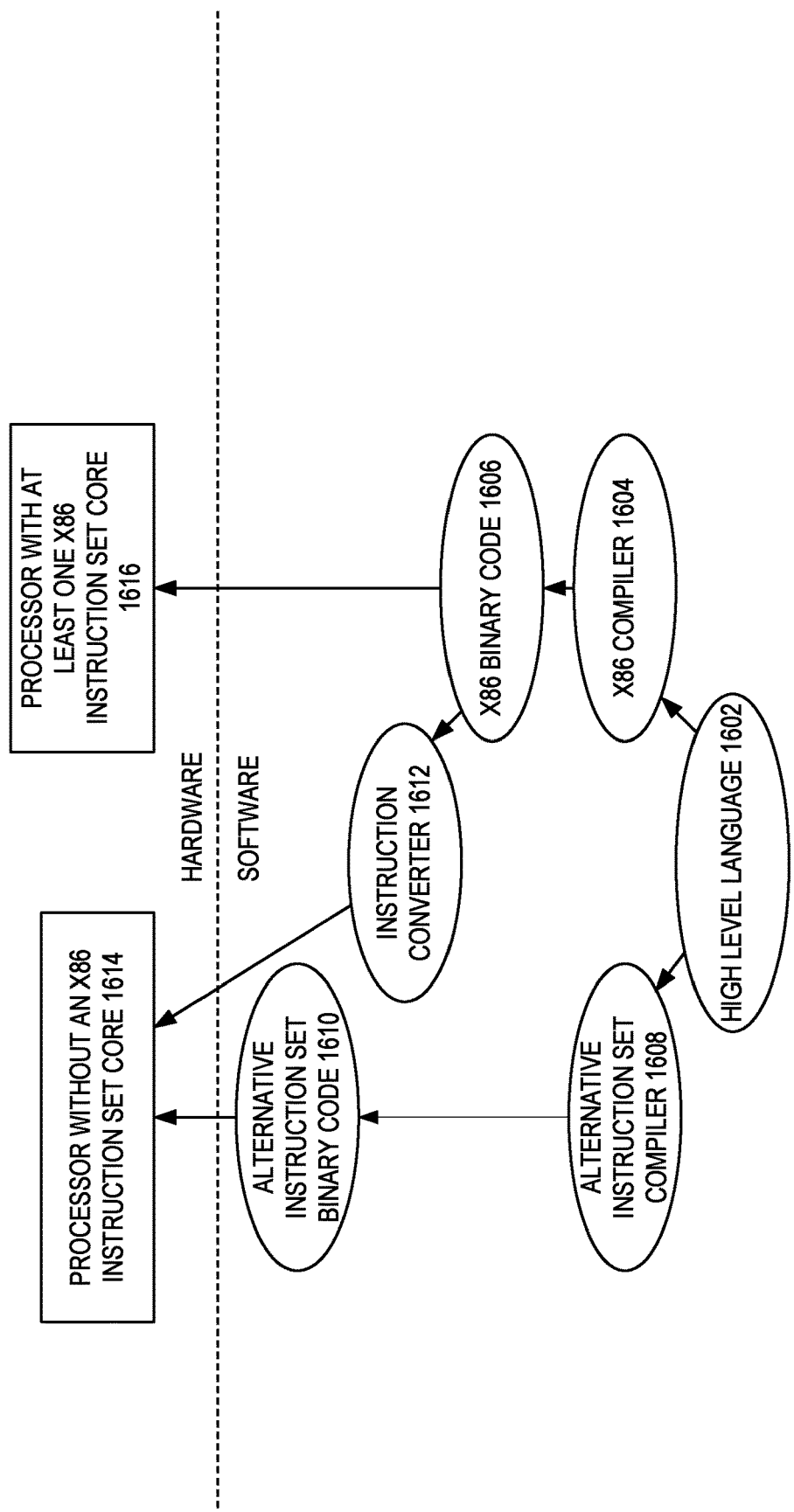
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. A hardware processor comprising:
a core to execute a thread and offload at least one of a compression thread and a decompression thread; and
a hardware compression and decompression accelerator to execute the at least one of the compression thread and the decompression thread to consume input data and generate output data, wherein the hardware compression and decompression accelerator is coupled to a plurality of input buffers to store the input data, a plurality of output buffers to store the output data, an input buffer descriptor array with an entry for each respective input buffer, an input buffer response descriptor array with a corresponding response entry for each respective input buffer, an output buffer descriptor array with an entry for each respective output buffer, and an output buffer response descriptor array with a corresponding response entry for each respective output buffer.

2. The hardware processor of claim 1, wherein the hardware compression and decompression accelerator is to compare an index for a last valid input entry of the input buffer descriptor array to an index for a last consumed input response entry of the input buffer response descriptor array and compare an index for a last valid output entry of the output buffer descriptor array to an index for a last consumed output response entry of the output buffer response descriptor array to determine when the at least one of the compression thread and the decompression thread is to execute to consume input data to generate output data.

3. The hardware processor of claim 1, wherein the core is to allocate the plurality of input buffers, load the plurality of input buffers with the input data, and load the entries in the input buffer descriptor array for each respective input buffer.

4. The hardware processor of claim 3, wherein the core is to allocate the plurality of output buffers for the output data and load the entries in the output buffer descriptor array for each respective output buffer.

5. The hardware processor of claim 1, wherein the hardware compression and decompression accelerator is to load the plurality of output buffers with the output data and load the corresponding response entries in the output buffer response descriptor array for each respective output buffer consumed.

6. The hardware processor of claim 5, wherein the hardware compression and decompression accelerator is to load the corresponding response entries in the input buffer response descriptor array for each respective input buffer consumed.

7. The hardware processor of claim 1, wherein the entries in the input buffer descriptor array each include a size of the input data stored in the respective input buffer, the corresponding response entries in the input buffer response descriptor array each include a size of the input data remaining in the respective input buffer, the entries in the output buffer descriptor array each include a size of the respective output buffer available to store output data, and the corresponding response entries in the output buffer response descriptor array each include a size of the output data stored in the respective output buffer.

8. The hardware processor of claim 1, wherein the input data is a stateful stream of data.

9. A method comprising:
receiving at least one of a compression thread and a decompression thread at a hardware processor;
offloading the at least one of the compression thread and the decompression thread to a hardware compression and decompression accelerator; and
executing the at least one of the compression thread and the decompression thread on the hardware compression and decompression accelerator to consume input data and generate output data, wherein the hardware compression and decompression accelerator is coupled to a plurality of input buffers to store the input data, a plurality of output buffers to store the output data, an input buffer descriptor array with an entry for each respective input buffer, an input buffer response descriptor array with a corresponding response entry for each respective input buffer, an output buffer descriptor array with an entry for each respective output buffer, and an output buffer response descriptor array with a corresponding response entry for each respective output buffer.

10. The method of claim 9, further comprising comparing an index for a last valid input entry of the input buffer descriptor array to an index for a last consumed input response entry of the input buffer response descriptor array and comparing an index for a last valid output entry of the output buffer descriptor array to an index for a last consumed output response entry of the output buffer response descriptor array to determine when the at least one of the compression thread and the decompression thread is to execute to consume input data to generate output data.

11. The method of claim 9, further comprising allocating the plurality of input buffers, loading the plurality of input buffers with the input data, and loading the entries in the input buffer descriptor array for each respective input buffer.

12. The method of claim 11, further comprising allocating the plurality of output buffers for the output data and loading the entries in the output buffer descriptor array for each respective output buffer.

13. The method of claim 9, further comprising loading the plurality of output buffers with the output data and loading the corresponding response entries in the output buffer response descriptor array for each respective output buffer consumed.

14. The method of claim 13, further comprising loading the corresponding response entries in the input buffer response descriptor array for each respective input buffer consumed.

15. The method of claim 9, providing the entries in the input buffer descriptor array that each include a size of the input data stored in the respective input buffer, the corresponding response entries in the input buffer response descriptor array that each include a size of the input data remaining in the respective input buffer, the entries in the output buffer descriptor array that each include a size of the respective output buffer available to store output data, and the corresponding response entries in the output buffer response descriptor array that each include a size of the output data stored in the respective output buffer.

16. The method of claim 9, wherein the input data is a stateful stream of data.

17. A system comprising:
a hardware processor to execute a thread and offload at least one of a compression thread and a decompression thread; and
a hardware compression and decompression accelerator to execute the at least one of the compression thread and the decompression thread to consume input data and generate output data, wherein the hardware compression and decompression accelerator is coupled to a plurality of input buffers to store the input data, a plurality of output buffers to store the output data, an input buffer descriptor array with an entry for each respective input buffer, an input buffer response descriptor array with a corresponding response entry for each respective input buffer, an output buffer descriptor array with an entry for each respective output buffer, and an output buffer response descriptor array with a corresponding response entry for each respective output buffer.

18. The system of claim 17, wherein the hardware compression and decompression accelerator is to compare an index for a last valid input entry of the input buffer descriptor array to an index for a last consumed input response entry of the input buffer response descriptor array and compare an index for a last valid output entry of the output buffer descriptor array to an index for a last consumed output response entry of the output buffer response descriptor array to determine when the at least one of the compression thread and the decompression thread is to execute to consume input data to generate output data.

19. The system of claim 17, wherein the hardware processor is to allocate the plurality of input buffers, load the plurality of input buffers with the input data, and load the entries in the input buffer descriptor array for each respective input buffer.

20. The system of claim 19, wherein the hardware processor is to allocate the plurality of output buffers for the output data and load the entries in the output buffer descriptor array for each respective output buffer.

21. The system of claim 17, wherein the hardware compression and decompression accelerator is to load the plurality of output buffers with the output data and load the corresponding response entries in the output buffer response descriptor array for each respective output buffer consumed.

22. The system of claim 21, wherein the hardware compression and decompression accelerator is to load the corresponding response entries in the input buffer response descriptor array for each respective input buffer consumed.

23. The system of claim 17, wherein the entries in the input buffer descriptor array each include a size of the input data stored in the respective input buffer, the corresponding response entries in the input buffer response descriptor array each include a size of the input data remaining in the respective input buffer, the entries in the output buffer descriptor array each include a size of the respective output buffer available to store output data, and the corresponding response entries in the output buffer response descriptor array each include a size of the output data stored in the respective output buffer.

24. The system of claim 17, wherein the input data is a stateful stream of data.

* * * * *